United States Patent
Chae et al.

(10) Patent No.: US 11,889,442 B2
(45) Date of Patent: Jan. 30, 2024

(54) METHOD AND DEVICE FOR TRANSMITTING AND RECEIVING SYNCHRONIZATION SIGNAL OF DEVICE-TO-DEVICE COMMUNICATION TERMINAL IN WIRELESS COMMUNICATION SYSTEM

(71) Applicant: LG Electronics Inc., Seoul (KR)

(72) Inventors: Hyukjin Chae, Seoul (KR); Hanbyul Seo, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/861,965

(22) Filed: Jul. 11, 2022

(65) Prior Publication Data

US 2022/0353833 A1    Nov. 3, 2022

Related U.S. Application Data

(63) Continuation of application No. 16/799,058, filed on Feb. 24, 2020, now Pat. No. 11,388,687, which is a
(Continued)

(51) Int. Cl.
*H04W 56/00* (2009.01)
*H04B 7/185* (2006.01)
(Continued)

(52) U.S. Cl.
CPC ...... *H04W 56/001* (2013.01); *H04B 7/18523* (2013.01); *H04B 7/18582* (2013.01);
(Continued)

(58) Field of Classification Search
CPC ........... H04W 56/001; H04W 56/0015; H04W 56/002; H04W 72/005; H04W 72/042;
(Continued)

(56) References Cited

U.S. PATENT DOCUMENTS

2016/0302250 A1* 10/2016 Sheng .................. H04W 76/14
2017/0019778 A1*  1/2017 Jung ..................... H04W 72/02
(Continued)

FOREIGN PATENT DOCUMENTS

CN      104935401        9/2015
KR   WO 2015/142090   *  9/2015   ............ H04W 72/04
(Continued)

OTHER PUBLICATIONS

3GPP TS 36.211 V13.2.0, 3rd Generation Partnership Project; Technical Specification Group Radio Access Network; Evolved Universal Terrestrial Radio Access (E-UTRA); Physical channels and modulation (Release 13), Jul. 1, 2016 (Year: 2016).
(Continued)

*Primary Examiner* — Jae Y Lee
(74) *Attorney, Agent, or Firm* — Fish & Richardson P.C.

(57) ABSTRACT

One embodiment of the present invention relates to a method for receiving a sidelink synchronization signal (SLSS) by a terminal in a wireless communication system, comprising the steps of: receiving a physical sidelink broadcast channel (PSBCH); determining which of global navigation satellite systems (GNSS) or an eNB is to be a synchronization source according to priority information included in the PSBCH; and receiving an SLSS associated with the determined synchronization source, wherein the terminal determines that the priority information is valid only when a public land mobile network (PLMN) associated with the priority information matches a PLMN to which the terminal belongs.

6 Claims, 12 Drawing Sheets

Related U.S. Application Data continuation of application No. 16/064,730, filed as application No. PCT/KR2017/010726 on Sep. 27, 2017, now Pat. No. 10,575,269.

(60) Provisional application No. 62/458,590, filed on Feb. 14, 2017, provisional application No. 62/458,562, filed on Feb. 13, 2017, provisional application No. 62/426,219, filed on Nov. 23, 2016, provisional application No. 62/407,513, filed on Oct. 12, 2016, provisional application No. 62/403,050, filed on Sep. 30, 2016, provisional application No. 62/400,623, filed on Sep. 27, 2016.

(51) Int. Cl.

| | | |
|---|---|---|
| *H04W 72/0446* | (2023.01) | |
| *H04W 72/23* | (2023.01) | |
| *H04W 72/30* | (2023.01) | |
| *H04W 72/51* | (2023.01) | |

(52) U.S. Cl.
CPC ..... *H04W 56/002* (2013.01); *H04W 56/0015* (2013.01); *H04W 72/0446* (2013.01); *H04W 72/23* (2023.01); *H04W 72/30* (2023.01); *H04W 72/51* (2023.01)

(58) Field of Classification Search
CPC ............ H04W 72/0446; H04W 72/048; H04B 7/18523; H04B 7/18582
See application file for complete search history.

(56) References Cited

U.S. PATENT DOCUMENTS

| | | | | |
|---|---|---|---|---|
| 2017/0142703 | A1* | 5/2017 | Xue | ............... H04W 76/14 |
| 2017/0188391 | A1 | 6/2017 | Rajagopal | |
| 2017/0215119 | A1* | 7/2017 | Hong | ............... H04L 67/12 |
| 2017/0280406 | A1 | 9/2017 | Sheng | |
| 2017/0289935 | A1* | 10/2017 | Yoon | ............... H04W 56/001 |
| 2019/0098589 | A1 | 3/2019 | Chae et al. | |

FOREIGN PATENT DOCUMENTS

| | | |
|---|---|---|
| KR | 20160096985 | 8/2016 |
| WO | WO2014182342 | 11/2014 |
| WO | WO2016099888 | 6/2016 |
| WO | WO2016126136 | 8/2016 |

OTHER PUBLICATIONS

CATT et al., R1-168455, WF on SLSS ID, 3GPP TSG RAN WG1 #86, Aug. 28, 2016 See pp. 2 and 3. (Year: 2016).

Extended European Search Report in European Application No. 17856736.8, dated Sep. 16, 2020, 11 pages.

Huawei et al., "OOC synchronization priority and SLSS ID set definition," 3GPP TSG RAN WG1 Meeting #86, dated Aug. 22-26, 2016, 4 pages.

Huawei et al., "PSBCH contents and SLSS transmission procedure," 3GPP TSG RAN WG1 Meeting #86, dated Aug. 22-26, 2016, 4 pages.

Huawei et al., "Timing alignment of different synchronization sources for V2V," 3GPP TSG RAN WG1 Meeting #86, dated Aug. 22-26, 2016, 4 pages.

Huawei et al., R1-164866, SLSS and PSBCH design for V2V PC5, 3GPP TSG RAN WG1 #85, May 14, 2016 See section 3. (Year: 2016).

International Search Report in International Application No. PCT/KR2017/010726, dated Jan. 22, 2018, 9 pages.

Notice of Allowance in Korean Application No. 10-2018-7021051, dated Sep. 27, 2019, 3 pages (with English translation).

Office Action in Chinese Application No. 201780059636.5, dated Nov. 12, 2020, 13 pages (with English translation).

Qualcomm Incorporated, "Synchronization Procedure for V2V," R1-155757, 3GPP TSG-RAN WG1 #82bis, Malmo, Sweden, dated Oct. 5-9, 2015, 4 pages.

Samsung, "Remaining issues on sidelink synchronization," R1-166721, 3GPP TSG RAN WG1 #86, Gothenburg, Sweden, dated Aug. 22-26, 2016, 5 pages, XP051140345.

\* cited by examiner

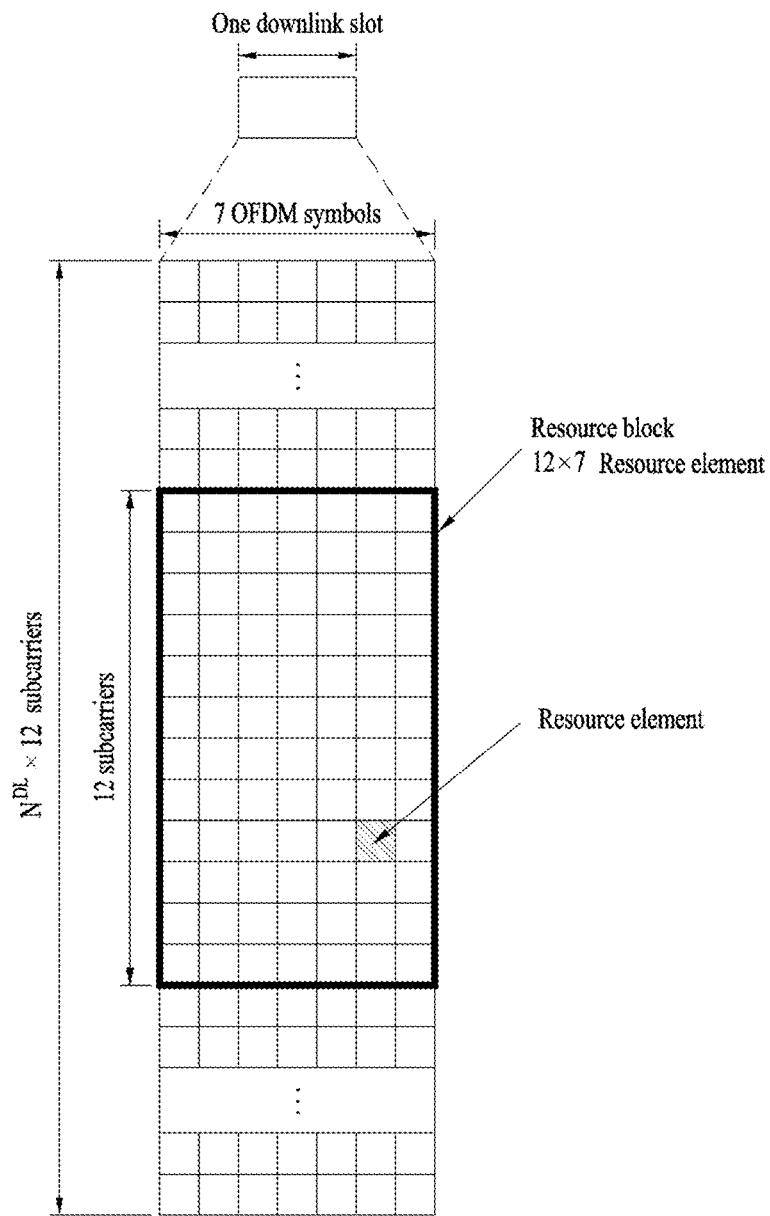

METHOD AND DEVICE FOR TRANSMITTING AND RECEIVING SYNCHRONIZATION SIGNAL OF DEVICE-TO-DEVICE COMMUNICATION TERMINAL IN WIRELESS COMMUNICATION SYSTEM

CROSS-REFERENCE TO RELATED APPLICATIONS

This application is a continuation of U.S. application Ser. No. 16/799,058, filed on Feb. 24, 2020, which is a continuation of U.S. application Ser. No. 16/064,730, filed on Dec. 10, 2018, now U.S. Pat. No. 10,575,269, which is a National Stage application under 35 U.S.C. § 371 of International Application No. PCT/KR2017/010726, filed on Sep. 27, 2017, which claims the benefit of U.S. Provisional Application No. 62/458,590, filed on Feb. 14, 2017, U.S. Provisional Application No. 62/458,562, filed on Feb. 13, 2017, U.S. Provisional Application No. 62/426,219, filed on Nov. 23, 2016, U.S. Provisional Application No. 62/407,513, filed on Oct. 12, 2016, U.S. Provisional Application No. 62/403,050, filed on Sep. 30, 2016, and U.S. Provisional Application No. 62/400,623, filed on Sep. 27, 2016. The disclosures of the prior applications are incorporated by reference in their entirety.

TECHNICAL FIELD

The following description relates to a wireless communication system and, more particularly, to a method and apparatus for transmitting and receiving a synchronization signal in the case where a satellite signal is available for synchronization.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

SUMMARY

An aspect of the present disclosure is to provide a method for selecting a synchronization source by assigning a priority level in association with a PLMN, and then receiving a synchronization signal, in the case where a satellite signal is available for synchronization.

It will be appreciated by persons skilled in the art that the objects that could be achieved with the present disclosure are not limited to what has been particularly described hereinabove and the above and other objects that the present disclosure could achieve will be more clearly understood from the following detailed description.

In an aspect of the present disclosure, a method for receiving a sidelink synchronization signal (SLSS) by a user equipment (UE) in a wireless communication system includes receiving a physical sidelink broadcast channel (PSBCH), determining which one between a global navigation satellite system (GNSS) and an eNB is to be used as a synchronization source, according to priority information included in the PSBCH, and receiving an SLSS related to the determined synchronization source. Only if a public land mobile network (PLMN) related to the priority information is identical to a PLMN to which the UE belongs, the UE determines that the priority information is valid.

In another aspect of the present disclosure, a user equipment (UE) for receiving a sidelink synchronization signal (SLSS) in a wireless communication system includes a transmitter, a receiver, and a processor. The processor is configured to receive a physical sidelink broadcast channel (PSBCH) through the receiver, to determine which one between a global navigation satellite system (GNSS) and an eNB is to be used as a synchronization source, according to priority information included in the PSBCH, to receive an SLSS related to the determined synchronization source, and to determine that the priority information is valid, only if a public land mobile network (PLMN) related to the priority information is identical to a PLMN to which the UE belongs.

The UE may always select an SLSS ID from a range of 170 to 335 irrespective of synchronization resources configured by the network or preconfigured.

The PSBCH may include a PLMN ID.

If the UE receives an SLSS for which the GNSS is a synchronization source, the UE may always transmit an SLSS.

If the UE receives an SLSS for which the GNSS is a synchronization source, the UE may transmit an SLSS for a predetermined time even though the UE loses GNSS reception.

A synchronization source may be configured per a resource pool.

If the synchronization source is the GNSS, a bitmap of a resource pool related to the GNSS may be based on D2D frame number (DFN) 0.

According to the present disclosure, a timing difference can be prevented, which might otherwise be produced if the priority levels of synchronization sources are different according to PLMNs.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 2 is a view illustrating a resource grid for the duration of a downlink (DL) slot;

DETAILED DESCRIPTION

Figure 1A:
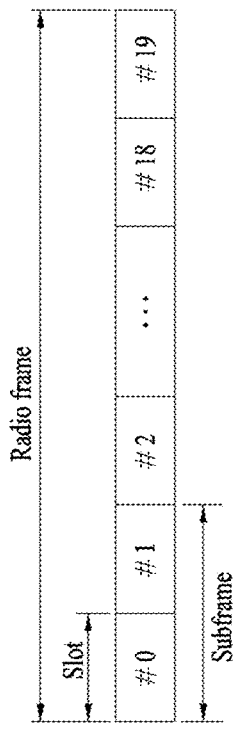
FIGS. 1A and 1B are views illustrating the structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

Figure 1B:
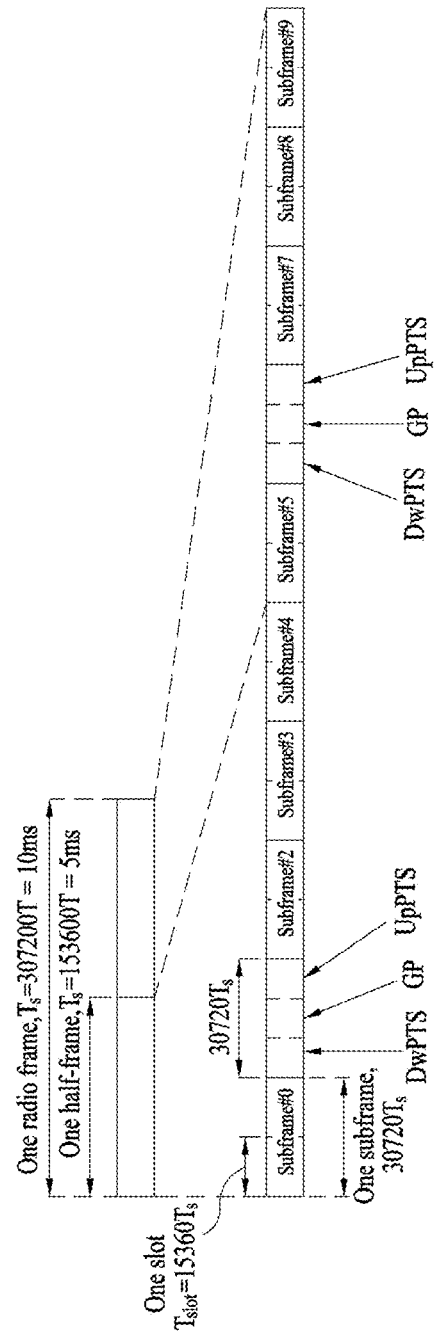

With reference to FIGS. 1A and 1B, the structure of a radio frame will be described below.

In a cellular orthogonal frequency division multiplexing (OFDM) wireless Packet communication system, uplink and/or downlink data Packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1A illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1B illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
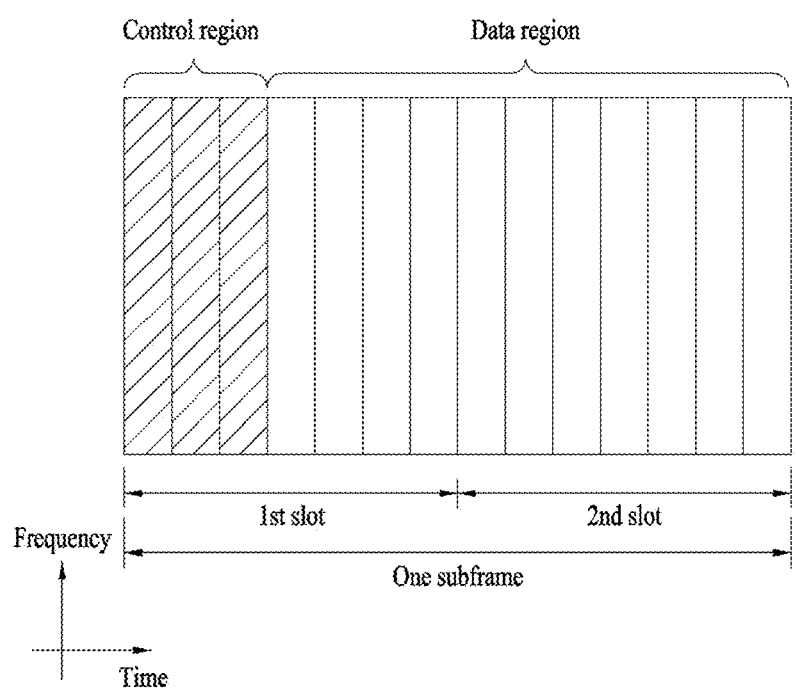
FIG. 3 is a view illustrating the structure of a DL subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
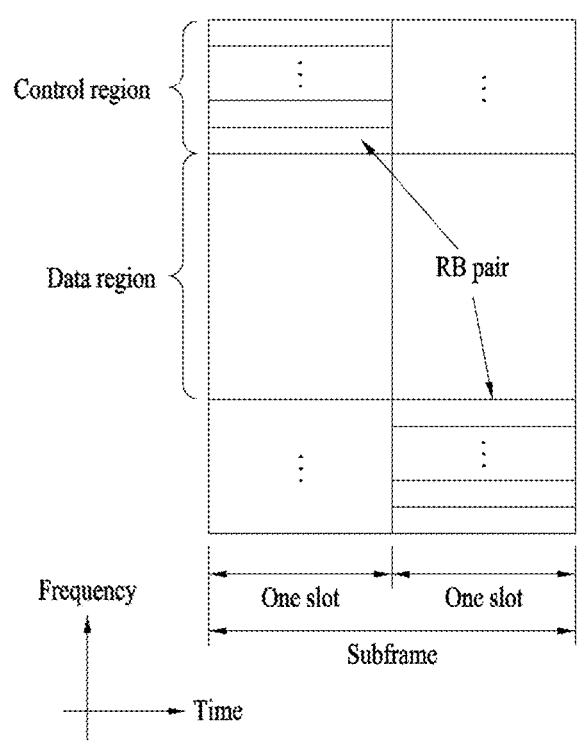
FIG. 4 is a view illustrating the structure of an uplink (UL) subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a Packet is transmitted on a radio channel. In view of the nature of the radio channel, the Packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:
 i) Demodulation-reference signal (DM-RS) used for channel estimation for coherent demodulation of information delivered on a PUSCH and a PUCCH; and
 ii) Sounding reference signal (SRS) used for an eNB or a network to measure the quality of an uplink channel in a different frequency.

The downlink RSs are categorized into:
 i) Cell-specific reference signal (CRS) shared among all UEs of a cell;
 ii) UE-specific RS dedicated to a specific UE;
 iii) DM-RS used for coherent demodulation of a PDSCH, when the PDSCH is transmitted;
 iv) Channel state information-reference signal (CSI-RS) carrying CSI, when downlink DM-RSs are transmitted;
 v) Multimedia broadcast single frequency network (MBSFN) RS used for coherent demodulation of a signal transmitted in MBSFN mode; and
 vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5A:
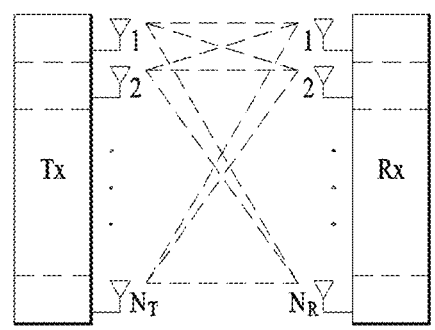
FIGS. 5A and 5B are views illustrating the configuration of a multi-antenna wireless communication system.
Figure 5B:
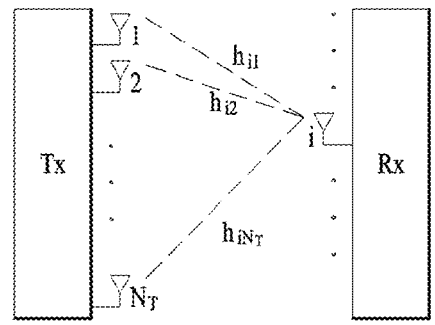

FIGS. 5A and 5B are diagram illustrating a configuration of a wireless communication system having multiple antennas.

As shown in FIG. 5A, if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

[Equation 1]

$$R_i = \min(N_T, N_R)$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

[Equation 2]

$$S = [S_1, S_2, \ldots, S_{N_T}]^T$$

Meanwhile, transmit powers can be set different from each other for individual pieces of transmission information $S_1, S_2, \ldots, S_{N_T}$, respectively. If the transmit powers are set to $P_1, P_2, \ldots, P_{N_T}$, respectively, the transmission information with adjusted transmit powers can be represented as Equation 3.

$$\hat{S} = [\hat{S}_1, \hat{S}_2, \ldots, \hat{S}_{N_T}]^T = [P_1 S_1, P_2 S_2, \ldots, P_{N_T} S_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $X_1, X_2, \ldots, X_{N_T}$, which are actually transmitted, by applying weight matrix W to the information vector $\hat{S}$ having the adjusted transmit powers, the weight matrix W serves to appropriately distribute the transmission information to each antenna according to a transport channel state $X_1, X_2, \ldots, X_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $W_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

[Equation 6]

$$y = [y_1, y_2, \ldots, y_{N_R}]^T$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5B is a diagram illustrating channels from the NT transmit antennas to the receive antenna i. The channels may be combined and expressed in the form of a vector and a matrix. In FIG. 5B, the channels from the NT transmit antennas to the receive antenna i can be expressed as follows.

[Equation 7]

$$h_i^T = [h_{i1}, h_{i2}, \ldots, h_{iN_T}]$$

Accordingly, all channels from the NT transmit antennas to the NR receive antennas can be expressed as follows.

[Equation 8]

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix}$$

An AWGN (Additive White Gaussian Noise) is added to the actual channels after a channel matrix H. The AWGN $n_1, n_2, \ldots, n_{N_R}$ respectively added to the NR receive antennas can be expressed as follows.

[Equation 9]

$$n = [n_1, n_2, \ldots, n_{N_R}]^T$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

[Equation 11]

$$\text{rank}(H) \leq \min(N_T, N_R)$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a DL PSS, the PD2DSS may use a different Zadoff-chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is

Figure 6:
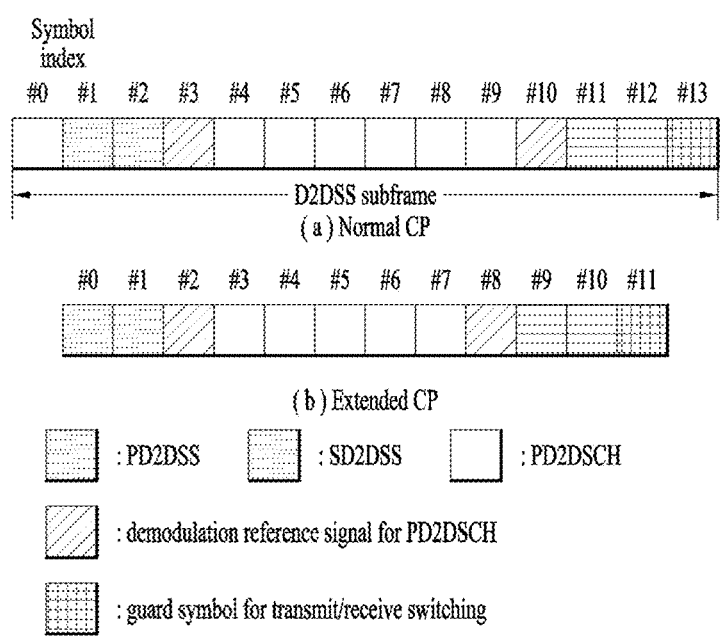
FIG. 6 is a view illustrating subframes each carrying a device-to-device synchronization signal (D2DSS)

[Equation 10]

a PSS/SSS. Unlike PSS/SSS of DL, the PD2DSS/SD2DSS follows UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
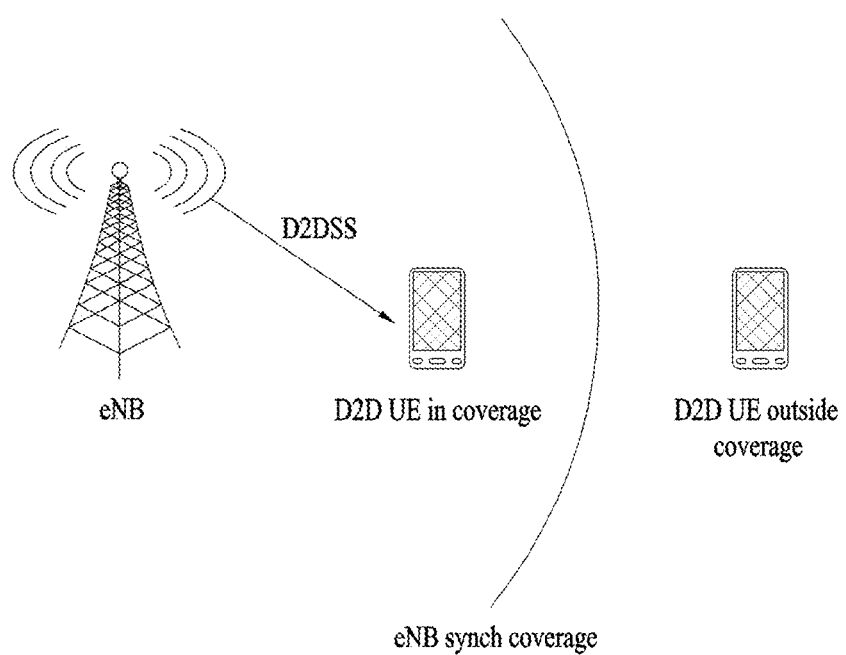
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

Figure 8A:
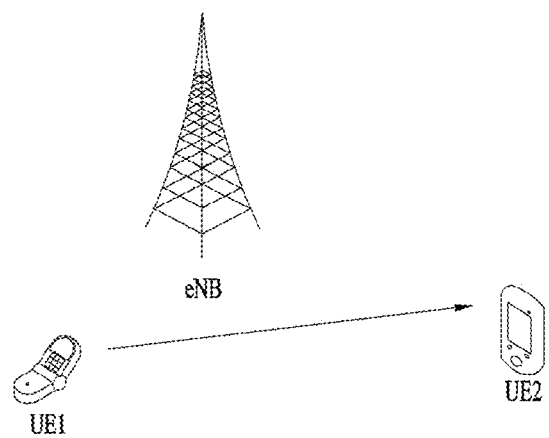
FIGS. 8A and 8B are views illustrating an exemplary D2D resource pool for D2D communication.
Figure 8B:
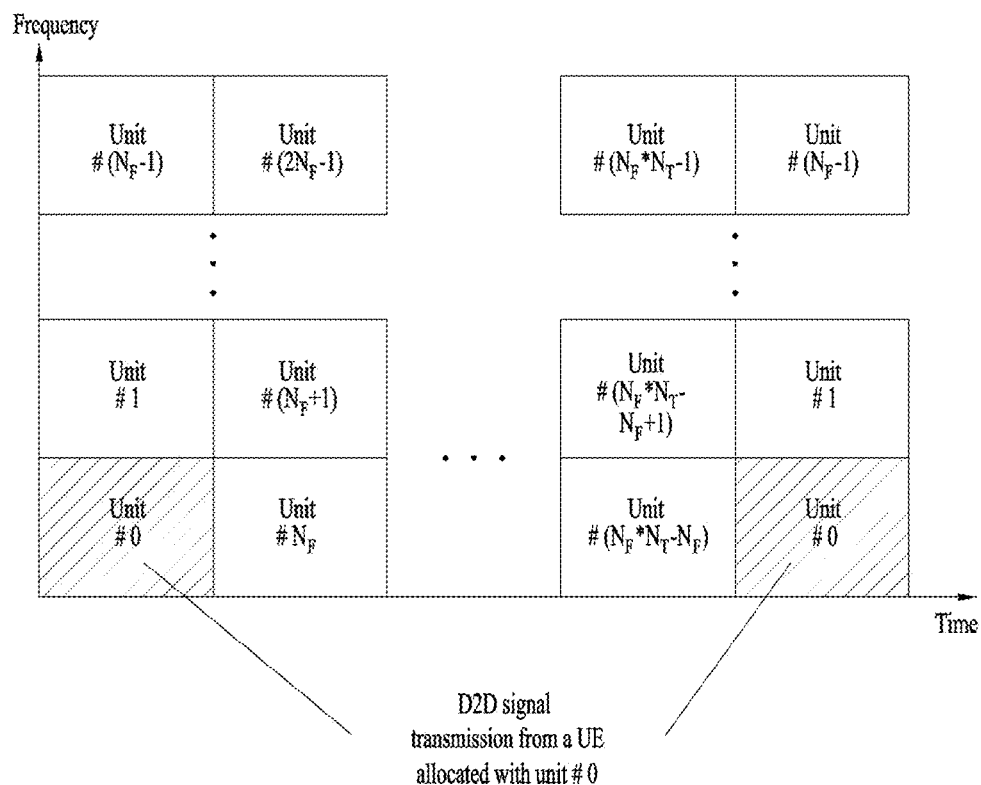

FIGS. 8A and 8B show an example of a UE1, a UE2 and a resource pool used by the UE1 and the UE2 performing D2D communication. In FIG. 8A, a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8B shows an example of configuring a resource unit. Referring to FIG. 8B, the entire frequency resources are divided into the NF number of resource units and the entire time resources are divided into the NT number of resource units. In particular, it is able to define NF*NT number of resource units in total. In particular, a resource pool can be repeated with a period of NT subframes. Specifically, as shown in FIGS. 8A and 8B, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmission UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as type 1.

SA Transmission/Reception

A mode-1 UE may transmit an SA (or D2D control signal) and sidelink control information (SCI) in resources configured by an eNB. For a mode-2 UE, the eNB configures resources for D2D communication. The mode-2 UE may select time-frequency resources from the configured resources and transmit an SA in the selected time-frequency resources.

Figure 9:
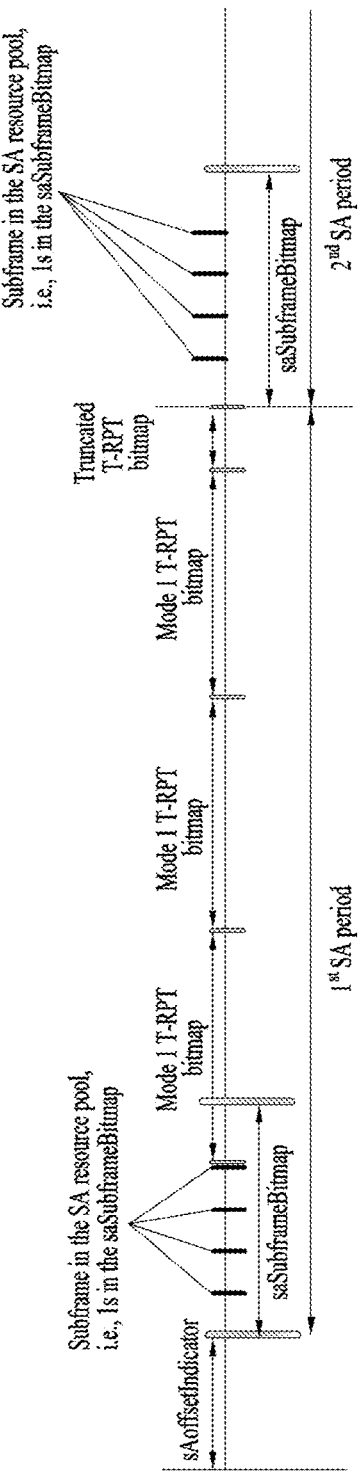
FIG. 9 is a view referred to for describing a scheduling assignment (SA) period.

A SA period may be defined as illustrated in FIG. 9. Referring to FIG. 9, a first SA period may start in a subframe spaced from a specific system frame by a predetermined offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA in a subframe bitmap, saSubframeBitmap. The resource pool for D2D data transmission may include subframes used for actual data transmission through application of a time-resource pattern for transmission (T-RPT) or a time-resource pattern (TRP) in mode 1. As illustrated, if the number of subframes included in an SA period except for an SA resource pool is larger than the number of T-RPT bits, the T-RPT may be applied repeatedly, and the last applied T-RPT may be applied truncated by as much as the number of remaining subframes.

Now, a description will be given of methods for acquiring time and frequency synchronization in D2D communication, particularly for communication between vehicles, between a vehicle and another terminal, and between a vehicle and an infrastructure network, based on the above description. The foregoing method related to a D2DSS is characterized in that priority is given to synchronization provided by a network. More specifically, a UE selects an SS transmitted directly by an eNB with a highest priority, in determining its transmission synchronization. If the UE is located outside the coverage of the eNB, the UE is first synchronized with a D2DSS transmitted by a UE within the coverage of the eNB. This operation is intended to bring about the effect of reliable multiplexing between a D2D operation and a legacy network operation (transmission and reception between an eNB and a UE) through synchronization of a UE with a timing provided by the network, if possible (e.g., the legacy network operation is performed in one subframe, and D2D communication is conducted in the next subframe). Meanwhile, a wireless terminal installed in a vehicle or a terminal mounted in a vehicle may not experience a relatively great battery consumption problem, and may use a satellite signal such as a global positioning system (GPS) signal for the purpose of navigation. Accordingly, the satellite signal is available for time or frequency synchronization between terminals. Besides a GPS signal, the satellite signal may be any of a global navigation satellite systems (GNSS) signal, a global navigation satellite system (GLONAS) signal, a GALILEO signal, a BEIDOU signal, and so on. While the following description is given mainly in the context of a GNSS signal and a GPS signal as satellite signals, by way of example, the satellite signals may be replaced with other satellite signals. Further, a vehicle (V)-UE may be a UE moving in a vehicle, and a pedestrian (P)-UE may be a UE moving on foot or on a cycle in the following description. Further, a GPS timing may refer to configuring a frame/subframe boundary based on an absolute time being a time acquired by GPS reception (e.g., a coordinated universal time (UTC) time or a GPS time) and then configuring a part or all of subframes as subframes for D2D signal transmission. A cellular timing means a frame/subframe boundary for a D2D signal, generated based on a time obtained by applying a predetermined offset (e.g., a timing advance) to a reception time of a PSS/SSS or SLSS transmitted by an adjacent eNB or RSU (e.g., an eNB or RSU from which a signal having a largest RSRP is received) or a reception time of a PSS/SSS transmitted by an eNB. A radio frame/subframe boundary may be set by applying a predetermined offset (the offset may be 0 under circumstances) to the PSS/SSS reception time and then some subframes may be configured as D2D subframes. In the following description, SLSS id_net may represent a set of SLSS IDs available for UEs which have selected an SS of an eNB as a synchronization reference, from among physical-layer SLSS IDs {0, 1, . . . , 335}. SLSS id_net may include SLSS IDs {168, 169, . . . , 335}.

Transmission/Reception and Priority of Sidelink Synchronization Signal (SLSS)

Figure 10:
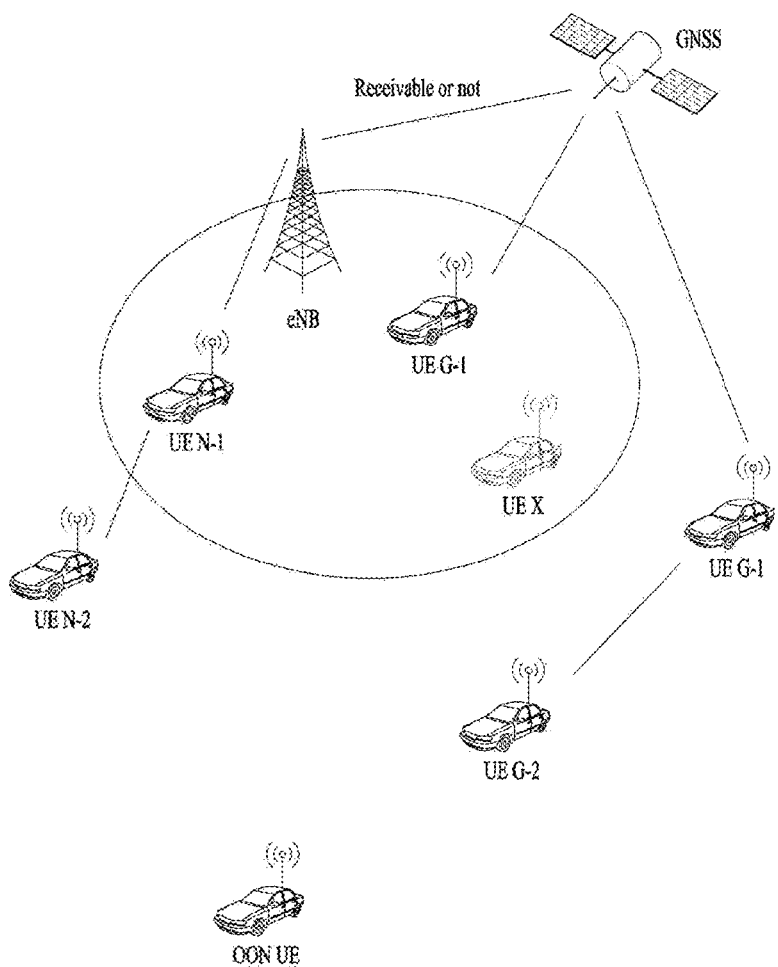
FIG. 10 is a view illustrating an exemplary situation in which a global navigation satellite system (GNSS) may be used as a synchronization source.

In a situation where a GNSS co-exists with an eNB, how a UE prioritizes SSs/synchronization sources in selecting an SS/synchronization source and transmitting an SS may be an issue. Now, a description will be given of various embodiments regarding the prioritization. Each entity described in the following description may be as illustrated in FIG. 10. Specifically, referring to FIG. 10, a GNSS, a GNSS-based UE (UE G-1), an eNB-based UE (UE N-1), a two-hop GNSS-based UE (UE G-2), a two-hop eNB-based UE (UE N-2), and an out-of-network (OON) UE are shown in FIG. 10. In FIG. 10, a solid line indicates that a signal is receivable directly from a corresponding transmission entity, which may be over 1 hop.

GNSS-based UE=eNB-based UE

An eNB-based UE may have the same priority as that of a GNSS-based UE. Regarding SS transmission in this case, an in-coverage UE may select an SLSS ID and transmit an SLSS generated based on the selected SLSS ID. The SLSS ID may be selected from the same SLSS ID set (e.g., SLSS id_net) as used for SLSS transmission of a UE which has received a PSS/SSS directly from an eNB and selected synchronization with the eNB as a timing and/or frequency reference (i.e. an eNB-based UE). Herein, for a GNSS UE, one SLSS ID may be selected from SLSS id_net (a set of SLSS IDs selected by eNB-based UEs). This ID may be preset or signaled by the network. A UE which has received a signal directly from the GNSS, has synchronized with the GNSS based on the received signal, and has selected the GNSS as a timing and/or frequency reference (i.e., a GNSS-based UE) may transmit an SLSS in the same resources as used for SLSS transmission of a UE which has received a PSS/SSS directly from the eNB, or in resources configured separately for GNSS-based UEs, and may use the same PSBCH field as a predetermined PSBCH field used for SLSS transmission by the UE which has received the PSS/SSS directly from the eNB. The predetermined PSBCH field is a coverage indicator field, and the value of the coverage indicator field may be set to 1.

That is, as the eNB-based UE and the GNSS-based UE use SSIDs (of the same level) (and/or the same resources and the same coverage indicators) selected from an SLSS ID set used by high-priority UEs, SLSSs transmitted by the eNB-based UE and the GNSS-based UE may be regarded as equal signals (i.e., signals with the same priority) by a receiving UE. In this case, the receiving UE may select an SLSS having a larger RSRP/sidelink RSRP (S-RSRP) as a synchronization source (a UE which has transmitted an SLSS having a large S-RSRP is selected as a synchronization source from among UEs which has received SLSSs directly from a UE and the eNB).

The above prioritization of an eNB-based UE and a GNSS-based UE into the same priority level may prevent a UE from selecting a UE transmitting a poor SS as a synchronization source. It is assumed that a higher priority is given to the eNB-based UE than the GNSS-based UE. Further, it is assumed that UE X receives an SS from each of UE G-1 (the GNSS-based UE) and UE N-1 (the eNB-based UE). In this case, an SLSS transmitted by the nearer UE G-1 will have a higher S-RSRP than an SLSS transmitted by UE N-1. However, UE X should select UE N-1 which is lower in S-RSRP but higher in priority than UE G-1, according to the priority of UE N-1. In this case, UE X may have difficulty in acquiring accurate synchronization. Moreover, if UE X which has acquired inaccurate synchronization transmits an SLSS based on the inaccurate synchronization, the SLSS may act as severe interference with other UEs receiving an SS from the GNSS. Therefore, the above prioritization of the eNB-based UE and the GNSS-based UE into the same priority level may overcome this problem. If the eNB-based UE and the GNSS-based UE have the same priority, an in-coverage UE selects a UE having the higher S-RSRP between the eNB-based UE and the GNSS-based UE as a synchronization source, and thus adjacent UEs commonly have the same synchronization source. In this case, the problem of interference caused by an SLSS transmitted by an asynchronous UE does not occur. In the above description, a GNSS signal may be receivable/available to the eNB. If a UE detects the eNB, the eNB may signal whether the eNB has priority over the GNSS or vice versa. Although it is preferable to give priority to the GNSS over the eNB for the purpose of decreasing a frequency offset, the eNB may have priority over the GNSS according to signaling.

GNSS based UE=eNB based UE >two hop GNSS based UE=two hop eNB based UE >OON UE

As described above, if the eNB-based UE and the GNSS-based UE have the same priority, it is natural that a two-hop eNB-based UE and a two-hop GNSS-based UE have the same priority. That is, the two-hop eNB-based UE and the two-hop GNSS-based UE may use the same all or part of resources, SLSS IDs, and PSBCH incoverage indicators. That is, the two-hop GNSS-based UE may use coverage indicator=0, SLSS id_net (reserved for the GNSS), and SLSS resources reserved for two-hop GNSS-based UEs. Likewise, the two-hop GNSS-based UE may use a preset id from SLSS id_net, an id signaled by the network, or an SLSS id of a GNSS-based UE which the two-hop GNSS-based UE has selected as a synchronization reference. SLSS resources used by the two-hop GNSS-based UE may be indicated by a PSBCH or the positions of the SLSS resources may be preset.

In consideration of all of the above descriptions, prioritization may be performed in the order of 'eNB >GNSS>GNSS based UE=eNB based UE >two hop GNSS based UE=two hop eNB based UE >OON UE' or 'GNSS>eNB>GNSS based UE=eNB based UE >two hop GNSS based UE=two hop eNB based UE >OON UE' (in this case, there may be no signaling for an additional priority. Or a signal indicating a GNSS signal is receivable in the eNB may be used for the purpose of indicating the above priorities).

GNSS >(direct)GNSS-based UE

For an out-of-coverage UE, the GNSS may have a highest priority. Then, priorities may be determined in consideration of whether a GNSS signal is receivable, a required frequency offset in the case of GNSS reception, and the number of hops. In a situation where the GNSS is not detected (in a tunnel or under a high pass), it is most reasonable to synchronize with an SLSS transmitted by a UE which has received a GNSS signal directly in that the GNSS timing is maintained. Therefore, a (direct) GNSS-based UE may have a priority next to the GNSS.

GNSS >(direct)GNSS-based UE >eNB-based UE >two-hop GNSS-based UE >two-hop eNB-based UE This prioritization may be for the case where a GNSS signal is receivable in the eNB. This considers whether the eNB has a GNSS reception capability, how tight a frequency offset requirement is, and so on. Specifically, in the case where the eNB is capable of receiving a GNSS signal and a frequency offset is commonly 0.1 ppm when the eNB receives a GNSS signal and when a UE receives a GNSS signal directly, the two-hop GNSS-based UE and the eNB-based UE have the same number of hops, two hops from the GNSS and the same expected frequency offset requirement. Considering that the eNB is always fixed and has a relatively small frequency offset, it is configured that the eNB-based UE has a higher priority than the two-hop GNSS-based UE.

GNSS >(direct)GNSS-based UE >eNB-based UE >Two-Hop GNSS-based UE >Two-hop eNB-based UE >Three-Hop GNSS-based UE >OON UE If an OON UE is defined to be two or more hops away, the above prioritization may be regulated.

GNSS >(direct)GNSS-based UE >eNB-based UE=Two-Hop GNSS-based UE >Two-hop eNB-based UE >OON UE This prioritization is characterized in that the eNB-based UE has the same priority as the two-hop GNSS-based UE. The prioritization is based on the consideration that the eNB-based UE and the two-hop GNSS-based UE are the same number of hops away from the GNSS and do not have a large timing difference. That is, as the same priority is assigned to the eNB-based UE and the two-hop GNSS-based UE, the eNB-based UE and the two-hop GNSS-based UE are allowed to use the same resources/SLSS ID/PSBCH, thereby achieving a single frequency network (SFN) effect (as different UEs transmit the same signal in the same resources, the signal is stably transmitted in the resources (with high reception power)) and enabling a later configuration without prioritization.

In the above prioritization, the eNB-based UE uses a network-signaled id from id_net and coverage indicator=1, for an SLSS. On the assumption that the two-hop GNSS-based UE uses the same id and PSBCH, the GNSS-based UE may use an SLSS id selected from id_net and coverage indicator=1, with only resources distinguished. However, in the case, the GNSS-based UE and the two-hop GNSS-based UE may not be distinguished from each other. In another method, although the GNSS-based UE uses coverage indicator=1, the GNSS-based UE may use an id reserved for the GNSS from in oon, or a PSSS with a different sequence ID. In this case, a one-hop GNSS-based UE may be distinguished from a two-hop GNSS-based UE by SLSS IDs. Under circumstances, the GNSS-based UE may use coverage indicator=0. That is, irrespective of coverage, the GNSS-based UE may use coverage indicator=0, and use a reserved id from id_oon or a different PSSS ID. The eNB-based UE and the two-hop GNSS-based UE may use coverage indicator=1, an SLSS ID from_id net, and the same SLSS resources.

Regarding the above prioritization, in the case of in-coverage, that is, in the case where a UE detects the eNB, the priorities may be in the order of eNB >GNSS >(direct) GNSS-based UE >eNB-based UE=two-hop GNSS-based UE >two-hop eNB-based UE >OON UE, or GNSS >eNB >(direct) GNSS-based UE >eNB-based UE=two-hop GNSS-based UE >two-hop eNB-based UE >OON UE.

If the eNB is not capable of receiving a GNSS signal, it is preferable in terms of continuity of a V2V operation to assign a lower priority to the eNB than the GNSS. In consideration of this, the priorities may be in the order of i)

GNSS>(direct) GNSS based UE, ii) GNSS>(direct) GNSS based UE>two hop GNSS based UE >eNB based UE>two hop eNB based UE >OON UE, iii) eNB>GNSS>(direct) GNSS based UE>two hop GNSS based UE >eNB based UE>two hop eNB based UE >OON UE, iv) eNB based UE >two hop eNB based UE >GNSS>GNSS based UE >two hop GNSS based UE >indirect (more than one hop) GNSS based UE>OON UE, v) GNSS>(direct) GNSS based UE>two hop GNSS based UE >eNB>eNB based UE>two hop eNB based UE >OON UE. Herein, some priorities may not be used. For example, if the eNB assigns a highest priority to the GNSS, an eNB-based synchronization source (eNB, a one-hop eNB-based UE, and a two-hop eNB-based UE) may be excluded from prioritization. As a result, timing discontinuity between heterogeneous synchronization sources may be eliminated, while only GNSS-based synchronization sources are used. Herein, exclusion from prioritization may mean that corresponding synchronizations signals are ignored even though the synchronization signals are received, or the eNB commands the eNB-based UE or the two-hop eNB-based UE not to transmit a D2DSS.

In the above description, the eNB should be able to fully control SLSS transmissions of in-coverage UEs. GNSS UEs may use reserved id_net (e.g., 0 or 167). If the eNB is capable of acquiring synchronization with the GNSS, the eNB may use id_net=167 and coverage indicator=1 for a UE (as if the GNSS were one cell). Regarding SLSSs transmitted by UEs, an SLSS with a higher priority is used. If the SLSSs have the same priority, an SLSS with a higher S-RSRP is used. Or if the eNB is capable of acquiring synchronization with the GNSS, the eNB may command an eNB-based UE to use the same SLSS ID as an id reserved for GNSS UEs and the same synchronization resources. This case may be intended to achieve the SFN effect by enabling the eNB-based UE and the GNSS-based UE to use the same SLSS.

[Table 1] below illustrates exemplary priorities and PSBCH and SLSS Id settings in relation to GNSS reception.

TABLE 1

| Case 1 | Priority | GNSS > eNB based UE = GNSS based UE > two hop eNB based UE = two hop GNSS based UE > OON UE |
| | PSBCH and SLSS Id setting | i. For GNSS-based UE, coverage indicator = 1 and SLSS ID from in_net (id_net may use ids configured for the GNSS commonly by all cells). ii. For two-hop GNSS-based UE, coverage indicator = 0 and SLSS ID from in_net (id_net may use ids configured for the GNSS commonly by all cells). iii. For others, id_oon and coverage indicator = 0. |
| Case 2 | Priority | GNSS > GNSS based UE > eNB based UE = two hop GNSS based UE > two hop eNB based UE > OON UE |
| | PSBCH and SLSS Id setting | i. For two-hop GNSS-based UE, coverage indicator = 1 and SLSS ID from id_netii. For GNSS-based UE, coverage indicator = 0 and SLSS ID from id_net. Or a little uniquely, for GNSS-based UE, coverage indicator = 1 and SLSS ID from id_oon, or a newly produced indicator. ii. For GNSS-based UE, coverage indicator = 0 or 1 and SLSS ID from id_net. To indicate GNSS direct, a new indicator is included using a reserved bit of a new PSBCH. |
| Case 3 | Priority | GNSS > GNSS based UE > eNB based UE > two hop GNSS based UE > two hop eNB based UE > OON UE |
| | PSBCH and SLSS Id | For eNB-based UE and two-hop eNB-based UE, the same as conventional (for eNB-based UE, coverage indicator = 1, and for two-hop eNB-based UE, coverage indicator = 0). For GNSS-based UE, coverage indicator = 1 and SLSS ID from id_net, and for two-hop GNSS-based UE, coverage indicator = 0 and SLSS ID from id_net, (id_net may use ids configured for the GNSS commonly by all cells). |
| Case 4 | Priority | GNSS > GNSS based UE > two hop GNSS based UE > eNB based UE > two hop eNB based UE > OON UE (for this operation, a high priority should be assigned to an SLSS ID used by the GNSS. That is, it may be regulated that if a specific SLSS ID is detected, the SLSS ID has a higher priority, irrespective of whether the coverage indicator is 0 or 1. Among SLSS IDs (used by the GNSS), an SLSS ID with coverage indicator = 1 has a higher priority because the SLSS ID is for a direct GNSS (GNSS-based) UE. |
| Case 5 | Priority | GNSS > eNB based UE > two hop eNB based UE > GNSS based UE > two hop GNSS based UE > OON UE (in this case, it is assumed that there is a nearby eNB. However, the GNSS has a highest priority not to breach the agreement of 3GPP RAN1 82bis that the GNSS has a highest priority out of coverage). |
| Case 6 | Priority | eNB based UE > two hop eNB based UE > GNSS > GNSS based UE > two hop GNSS based UE > OON UE (for this prioritization, it is necessary to signal which type of synchronization has priority to an out-of-coverage UE. It may be signaled whether the GNSS type (GNSS, GNSS-based UE, and two-hop GNSS-based UE) or the eNB type (eNB, eNB-based UE, and two-hop eNB-based UE) has priority by means of a PSBCH reserved bit. Further, this indication bit may be preconfigured to a specific state). |
| Case 7 | Priority | The priorities of GNSS-based and eNB-based are determined using the S-RSRPs of received signals (in this case, all SLSS IDs are regarded as having the same priority, without prioritization, and it is determined whether GNSS-based or eNB-based has priority, using S-RSRP). |

The PSBCH and SLSS Id settings of Case 4 to Case 7 may be similar to that of Case 3. Case 1 to Case 3 may correspond to the case where the eNB is capable of GNSS reception, and Case 4 to Case 7 may correspond to the case where the eNB is not capable of GNSS reception. That is, priorities may be defined depending on whether the eNB is capable of GNSS reception. In the case of out-of-coverage, it may be preferable that GNSS >GNSS-based UE.

[Table 2] below illustrates an exemplary relationship between PSBCH settings (coverage indicator settings) and SLSS ID settings.

TABLE 2

| Case 1 | SLSS ID setting | GNSS-based UE and two-hop GNSS-based UE use a predetermined SLSS (a specific ID from SLSS id_net may be reserved for GNSS usage. |
| | Coverage indicator setting | Coverage indicator = 1 for GNSS-based UE, and coverage indicator = 0 for two-hop GNSS-based UE. |

TABLE 2-continued

| | | |
|---|---|---|
| | Others | The same as conventional for eNB-based UE. Coverage indicator = 1 for eNB-based UE, and coverage indicator = 0 for two-hop eNB-based UE. |
| Case 2 | SLSS ID setting | GNSS-based UE: SLSS ID reserved for the GNSS from id_oon. Two-hop GNSS-based UE: id_net having the same SSSS as the foregoing id_oon among id_net. |
| | Coverage indicator setting | GNSS-based UE: coverage indicator = 0. Two-hop GNSS-based UE: coverage indicator = 1. |
| | Others | Prioritization rule: a higher priority may be assigned to a signal from Id_oon with coverage indicator = 1 than other UE types. |
| Case 3 | SLSS ID setting | GNSS-based UE and two-hop GNSS-based UE: SLSS ID reserved for the GNSS from id_net. |
| | Coverage indicator setting | GNSS-based UE and two-hop GNSS-based UE: coverage indicator = 1. |
| | Others | PSBCH reserved bit: GNSS direct or GNSS indirect is indicated by the reserved bit, or a field indicating the count of hops from the GNSS is indicated by the reserved bit. If the eNB is capable of GNSS reception, the PSBCH reserved bit may be appropriately set, for SFN with PSBCHs transmitted by GNSS UEs. If the PSBCH bit is set to the same for the eNB-based UE and the GNSS-based UE, the eNB-based UE and the GNSS-based UE have the same priority. If the PSBCH bit is set to the same for the two-hop eNB-based UE and the GNSS-based UE, the two-hop eNB-based UE and the GNSS-based UE have the same priority. In this manner, the eNB may establish a priority relationship with GNSS timing-based SLSSs by appropriately setting SLSS IDs, the coverage indicator, and the PSBCH reserved bit. |

[Table 3] below illustrates exemplary priorities in terms of prioritization.

TABLE 3

| | |
|---|---|
| Case 1 | GNSS > GNSS based UE > two hop GNSS based UE > eNB based UE > two hop eNB based UE > oon UE SLSS used by the GNSS is prioritized. |
| Case 2 | GNSS > GNSS based UE = eNB based UE > two hop GNSS based UE = two hop eNB based UE > oon UE |
| Case 3 | GNSS > GNSS based UE > two hop GNSS based UE = eNB based UE > two hop eNB based UE > oon UE All or a part of the coverage indicator, PSBCH reserved bit, and id setting methods may be set differently between the GNSS-based UE and the two-hop GNSS-based UE to distinguish them from each other. |
| Case 4 | GNSS > eNB based UE > two hop eNB based UE > GNSS based UE > two hop eNB based UE > oon UE SLSS used by the GNSS is deprioritized. A prioritization relationship may be signaled by the network, on a PSBCH by an in-coverage UE, or preconfigured. |
| Case 5 | GNSS > eNB based UE > GNSS based UE > two hop eNB based UE > two hop based GNSS based UE > oon UE Prioritized according to SLSS ids in spite of the same coverage indicator. |
| Case 6 | GNSS > GNSS based UE > eNB based UE > two hop based GNSS based UE > two hop eNB based UE > oon UE Prioritized according to SLSS ids in spite of the same coverage indicator. |
| Case 7 | eNB based UE > two hop eNB based UE > GNSS > GNSS based UE > two hop GNSS based UE > oon UE |
| Case 8 | eNB based UE > GNSS > GNSS based UE >, = two hop eNB based UE >, = two hop GNSS based UE > oon UE |
| Case 9 | eNB based UE > GNSS > two hop eNB based UE >, = GNSS based UE >, = two hop GNSS based UE > oon UE |

In the above table, >,=means an equal or higher priority, and an equal priority means that prioritization is performed based on S-RSRPs. In the above table, a specific synchronization source may be excluded from priority levels. Priority may be determined between the eNB-based UE and the GNSS-based UE or between the eNB and the GNSS by comparing an RSRP and an S-RSRP from the eNB or an RSRP from the eNB and the reception quality of a GNSS signal (or a value obtained by applying a specific offset to each measurement metric. Herein, the offset applied to each metric may be preset or signaled to a UE in a physical-layer signal or a higher-layer signal by the network). This operation is advantageous in that a synchronization problem in an asynchronous network may be solved with the assistance of the GNSS and no additional priority signaling is needed by following an eNB timing in coverage where a signal from the eNB is strong and following a GNSS timing between cells.

Regarding priority between the eNB and the GNSS, if the eNB considers a cellular operation as important, it may be indicated that the eNB has priority over the GNSS. If the GNSS-based UE has a high priority, a synchronization reference may be changed too often. Therefore, the eNB may have a higher priority than the GNSS-based UE. In this case, the network may indicate the priority of the eNB. If out-of-coverage UEs regard the GNSS as having a highest priority, cell-edge cellular UEs may be interfered by an out-of-coverage D2D operation. Accordingly, in this case, the eNB-based UE may have a higher priority than the GNSS as in Case 8. If the same priority is assigned to the eNB-based UE and the GNSS-based UE, the eNB-based UE=the GNSS-based UE eventually has a higher priority than the GNSS. Herein, among GNSS-based UEs, different SLSS ids may be configured between an out-of-coverage UE receiving a GNSS signal and an in-coverage UE receiving a GNSS signal. For example, the in-coverage UE receiving a GNSS signal uses a preset ID from SLSS id_net, and the out-of-coverage UE receiving a GNSS signal uses a preset ID from SLSS id_oon. Then, even though the out-of-coverage UE is a GNSS-based UE, the UE may have a lower priority than the GNSS. That is, priorities may be set in the order of eNB based UE=GNSS based UE with in coverage>GNSS >GNSS based UE in out coverage >two hop GNSS based UE >OOC UE synched to two hop UEs >other (standalone) OOC UEs. This is a prioritization for cancelling interference of a cell-edge UE through a combination of the above cases.

Multi-Carrier Situation (Operation in Different Carriers)

In the foregoing description, although the eNB may be detected in a carrier in which a V2V operation is performed, the eNB may be detected in any other carrier (e.g., a legacy LTE carrier). In the presence of multiple carriers, priority may be determined/set between the GNSS and the eNB on a carrier basis. If the priorities of the GNSS and the eNB are not set on a carrier basis, the out-of-coverage prioritization (i.e., the highest priority is assigned to the GNSS) should be followed in a cell in which the eNB is not deployed. In this case, the eNB timing is used for a carrier in which the eNB is deployed, and the GNSS timing is used for a carrier in which the eNB is not deployed (in a carrier aggregation situation), thereby causing a timing difference between the two carriers. Since a UE sets power on a subframe basis in this case, the UE should determine transmission power in advance in consideration of power available for a subsequent subframe in the case where a subframe is partially overlapped between the two carriers. Therefore, the UE may not fully use transmission power in each subframe. In other words, in order to reduce a transmission power mismatch in a subframe caused by the timing difference, the transmission power should be reduced. Therefore, this problem may be overcome by assigning priorities on a carrier basis. For example, even though an operator performs a D2D operation for a specific UE in a carrier in which the eNB is not deployed, the UE may be configured to acquire subframe synchronization using an eNB signal of another carrier.

The eNB may signal priorities determined for each carrier. If the timing of the eNB detected in a carrier in which a V2V operation does not take place is used, an eNB-based synchronization priority may be set to be lower than a GNSS-based synchronization priority. If the eNB is deployed in both a carrier in which a V2V operation takes place and an LTE carrier, the eNB may have a higher priority in the carrier in which a V2V operation takes place than in the LTE carrier.

If there is additional priority signaling regarding per-carrier synchronizations, corresponding priorities may be followed. That is, the LTE carrier may have a higher priority than the V2V carrier in some cases, which is done to protect operations in the legacy LTE carrier.

More specifically, the afore-described priorities may be determined separately for carrier A in the order of X>Y>Z and for carrier B in the order of Z>Y>Z? (herein, X, Y and Z represent synchronization sources in the afore-described synchronization prioritizations). To determine these priorities, the network may indicate per-carrier synchronization priorities to a UE by a physical-layer signal or a higher-layer signal.

If the UE fails to receive the signaling, the UE may follow the out-of-coverage prioritization, which may be preset.

Different Operators Situation (Different Operators Operation)

In the case where two UEs, UE A and UE B belong to different operators and the operators have different eNB timings, even though the UEs are eNB-based UEs, the UEs have different timings. A specific operator may deploy a GNSS-enabled eNB, and the other operator may deploy a GNSS-disabled eNB. In this case, GNSS timing information may be transmitted between to the two operators through signaling between networks, or a UE feeds back information indicating detection of a GNSS-based SLSS to its operator so that the GNSS-disabled eNB may re-set a subframe boundary, thereby reducing the effects of a V2V operation.

Meanwhile, even though the eNB of a specific carrier is capable of receiving a GNSS signal, if the eNB of another specific carrier fails to receive a GNSS signal, a D2D subframe may not be used at a UTC timing based on the GNSS. Generally, if the eNB fails to use the D2D subframe configured at the GNSS-based UTC timing, the eNB may signal an offset between the timing used by the eNB and the UTC timing to a UE by a physical-layer signal or a higher-layer signal.

Meanwhile, while an eNB implicitly signals the use of a GNSS in the propose methods, the eNB may explicitly signal the use of a GNSS to a UE by a physical-layer signal or a higher-layer signal. Thus, the freedom of setting an SLSS at the eNB may be advantageously increased.

Another embodiment regarding synchronization prioritization will be described below with reference to FIG. 10.

Synchronization prioritization may be performed in consideration of the followings.

i) Hop count from GNSS (a smaller hop count has a higher priority, and a maximum hop count is limited as in LTE Release 12). ii) Frequency offset (a frequency offset is related to hop counts from the eNB, a UE, and the GNSS). iii) Priority indication from the eNB (the network may explicitly or implicitly indicate which one between the eNB timing and the GNSS timing has a higher priority). iv) GNSS reception capability of the eNB (if the eNB does not have the GNSS reception capability, the GNSS timing may have a higher priority than the eNB timing, for a better V2V operation). vi) Influence on Uu (related to the GNSS reception capability of the eNB. Cell-edge UE performance and a Uu operation should be considered).

Synchronization priorities for out-of-coverage UEs are first considered. The GNSS has a highest priority. Then, in the in-coverage case, the priorities of the GNSS-based UE (UE G-1) and the eNB-based UE (UE N-1) need to be determined.

If the eNB has the GNSS reception capability, UE G-1 is one hop away from the GNSS, and UE N-1 is two hops away from the GNSS. Accordingly, UE G-1 may have a higher priority than UE N-1. However, if the eNB has the GNSS reception capability, the eNB may have a very small frequency offset requirement, and UE G-1 may have the same priority as UE N-1. The same priority means that if a plurality of synchronization sources have the same priority, a synchronization source is selected based on S-RSRP measurements.

Another issue is to determine whether priority determined between UE G-1 and UE N-1 interferes with Uu. If UE G-1 has a higher priority than UE N-1, the cell-edge performance of a TDD cell may be degraded significantly, and V2V operations may not be subjected to TDM reliably in FDD. This issue is also related to priority between the GNSS and UE N-1. However, the GNSS has the highest priority outside coverage. To assign a higher priority UE-N1 than the GNSS, an agreement should be changed. In summary, the priorities may be determined in the order of GNSS >UE G-1>UE N-1, GNSS >UE G-1=UE N-1, or UE N-1>GNSS >UE G-1 (if the agreement is changed so that the eNB can prioritize synchronization sources originated from the eNB, and the network has (pre)configured that an eNB-based synchronization reference is a higher priority than the GNSS). Subsequently, priority needs to be determined between the two-hop GNSS-based UE (UE G-2) and the eNB-based UE (UE N-1).

When the eNB has the GNSS reception capability, UE G-2 is two hops away from the GNSS, and UE N-1 is also two hops away from the GNSS. This implies that UE G-2 and UE N-1 have the same priority. On the other hand, the eNB is always at a fixed position, and UE G-1 is movable. Thus, since the total frequency offset of UE N-1 is smaller than that of UE-G2, UE-N1 has a higher priority than UE-G2. If the eNB does not have the GNSS reception capability, UE N-1 and UE G-2 may be prioritized based on a network configuration. If the network always puts GNSS-based synchronization first, UE G-2 may have a higher priority than UE N-1. Accordingly, UE N-1 and UE G-2 may be prioritized as follows: UE N-1=UE G-2, UE N-1>UE G-2, or UE G-2>UE N-1.

A similar analysis may be applied to determination of priority between UE N-2 and UE G-2. It is natural that the OON UE has a lowest priority.

A case in which an in-coverage UE may detect a signal from the eNB is considered. The network may prioritize eNB-based synchronization and GNSS-based synchronization. Even though the network assigns a higher priority to the eNB-based synchronization than the GNSS-based synchronization, if the UE is out of coverage, the prioritization of the eNB may be nullified due to the legacy agreement (RAN1 #82bis). Hence, unless the agreement is amended, the eNB-based synchronization priority may not be achieved perfectly. Moreover, the eNB may appropriately set an SLSS ID and PSBCH content, and there may be no need for explicit signaling for the GNSS-based synchronization priority, which will be described later.

In summary, one of various prioritizations such as options listed in [Table 4] may be used for out-of-coverage UEs.

TABLE 4

| Option | Priority order |
|---|---|
| option 1 | GNSS > UE G-1 > UE N-1 > UE G-2 > UE N-2 > OON UE |
| option 2 | GNSS > UE G-1 = UE N-1 > UE G-2 = UE N-2 > OON UE |
| option 3 | GNSS > UE G-1 > UE N-1 = UE G-2 > UE N-2 > OON UE |
| option 4 | UE N-1 > UE N-2 > GNSS > UE G-1 > UE G-2 > OON UENote: modifying agreement is necessary. |
| option 5 | GNSS > UE G-1 > UE G-2 > UE N-1 > UE N-2 > OON UENote: GNSS synchronization prioritization is preconfigured or signaled via PSBCH. |

SLSS ID and PSBCH settings may be given as follows.

It may be preferred to separate a GNSS-based SLSS ID from an eNB-based SLSS ID. To minimize the influence on the legacy technology, it is possible to reserve an existing SLSS ID as a GNSS-based SLSS ID. Herein, the eNB does not prohibit an in-coverage UE from transmitting a GNSS-based SLSS ID. For example, if the eNB is capable of receiving a GNSS signal, the eNB may command the in-coverage UE to use a GNSS-based SLSS ID.

A PSBCH field may be set differently according to a priority option. In Option 2, UE G-1 and UE N-1 have the same priority. In this case, if coverage indicator=1 for UE G-1, UE N-1 and UE G-1 may be SFNed. If different types of SSs are SFNed, each UE does not need to perform separate measurements for synchronization measurements, thereby simplifying UE implementation. [Table 5] below lists SLSS ID and PSBCH settings in each option of [Table 4].

Option 1 and Option 2 do not request use of the PSBCH reserved bit. The difference between Option 1 and Option 2 is whether the GNSS is prioritized in the same hop count. In Option 2, a UE determines a synchronization source based on an S-RSRP measurement. On the other hand, the GNSS is prioritized in the same hop count in Option 1. To describe more specific issues of Option 1 and Option 2, a situation in which a UE can see two UEs, UE N-1 and UE G-1 within coverage, and is nearer to UE N-1 is considered. In Option 1, a receiving UE prioritizes UE N-1. Any option should be able to deal with a multiple timing issue when the eNB is not capable of receiving a GNSS signal.

TABLE 5

| Option | SLSS ID and PSBCH setting for UE G-1 and UE G-2 |
|---|---|
| option 1 | Priority: GNSS > UE G-1 > UE N-1 > UE G-2 > UE N-2 > OON UESLSS ID for UE G-1: An ID in in_net is reserved for GNSS based synchronizationCoverage indicator for UE G-1: 1SLSS ID or UE G-2: fAn ID in in_net is reserved for GNSS based synchronizationCoverage indicator for UE G-2: 0Note: The ID reserved for GNSS based synchronization has higher priority than other IDs in id_net. |
| option 2 | Priority: GNSS > UE G-1 = UE N-1 > UE G-2 = UE N-2 > OON UESLSS ID for UE G-1: in_net reserved for GNSS based synchronizationCoverage indicator for UE G-1: 1SLSS ID for UE G-2: in_net reserved for GNSS based synchronizationCoverage indicator for UE G-2: 0 |
| option 3 | Priority: GNSS > UE G-1 > UE N-1 = UE G-2 > UE N-2 > OON UESLSS ID for UE G-1: in_net reserved for GNSS based synchronizationCoverage indicator for UE G-1: 1New field using PSBCH reserved bits for indication of direct GNSS reception: 1SLSS ID for UE G-2: in_net reserved for GNSS based synchronizationCoverage indicator for UE G-2: 1New field using PSBCH reserved bits for indication of direct GNSS reception: 0 |
| option 4 | Priority: UE N-1 > UE N-2 > GNSS > UE G-1 > UE G-2 > OON UESLSS ID for UE G-1: an ID in id_oon is reserved for GNSS based synchronizationCoverage indicator for UE G-1: 1Or coverage indicator for UE G-1: 0 and new field for indication direct GNSS reception: 1SLSS ID for UE G-2: an ID in id_oon is reserved for GNSS based synchronizationCoverage indicator for UE G-2: 0Or coverage indicator for UE G-1: 0 and new field for indication direct GNSS reception: 0 |
| option 5 | Priority: GNSS > UE G-1 > UE G-2 > UE N-1 > UE N-2 > OON UESLSS ID for UE G-1: an ID in id_net is reserved for GNSS based synchronizationCoverage indicator for UE G-1: 1Or coverage indicator for UE G-1: 1 and new field for indication direct GNSS reception: 1SLSS ID for UE G-2: an ID in id_net is reserved for GNSS based synchronizationCoverage indicator for UE G-2: 0Or coverage indicator for UE G-1: 1 and new field for indication direct GNSS reception: 0 |

Option 1 or Option 2 does not need a new PSBCH field, and may minimize the influence on the legacy synchronization procedure. Accordingly, Option 1 or Option 2 may be supported for PC5-based V2V.

To cope with a high frequency offset, a high-density DMRS and a comb-type RS may be considered. A similar approach should be applied to a PSBCH for PCS-based V2V. For example, a PSBCH DMRS is located in SC-FDMA symbol 5 in the first slot and SC-FDMA symbol 1 in the second slot. A new PSBCH format may be used in a high carrier frequency, and the network may indicate which PSBCH format is used. That is, a PSBCH DMRS type, number, and position may be modified for the PCS-based V2V operation.

Meanwhile, in order to maintain the legacy rel. 12/13 operations, even though a UE has received a GNSS signal, a different coverage indicator and/or a different SLSS ID may be configured for the UE according to a coverage state. (Legacy operations are maintained). Herein, the eNB may indicate, to the GNSS-receiving UE, a specific ID among SLSS IDs available for UEs receiving a GNSS signal directly. Owing to this operation, an in-coverage UE capable of GNSS reception can naturally receive a GNSS signal, having a higher priority than an out-of-coverage UE. Further, the GNSS-based UE naturally has a higher priority than the OON UE. For this operation, the eNB may signal a (pre-)configured SLSS ID selected from SLSS id net to an in-coverage GNSS-receiving UE, and the UE which has received a GNSS signal may transmit an SLSS, using the SLSS ID indicated by the eNB. Under circumstances, a configured SLSS ID and a pre-configured SLSS ID for the GNSS may be different. In the case where an out-of-coverage UE receives a GNSS signal, the coverage indicator may be set to 0 or an SLSS ID preset from SLSS ID_oon may be used. In this manner, SLSS transmission operations may be differentiated for in-coverage and out-of-coverage UEs receiving GNSS signals, and the in-coverage UE receiving a GNSS signal may have a higher priority.

This method reflects assignment of the same priority to a GNSS-based SLSS and an SLSS of an in-coverage UE from the foregoing description. Herein, to maintain the legacy operations, an out-of-coverage UE has a lower priority than an in-coverage GNSS-based UE and a higher priority than the OON UE, even though the out-of-coverage UE is a (direct) GNSS-based UE.

Meanwhile, if an SLSS is transmitted using a separate PSSS root index (e.g., 38) instead of an SLSS ID reserved for the GNSS in SLSS id_net in the method of setting an incoverage indicator to 1 for a UE receiving a GNSS signal directly and setting the incoverage indicator to 0 for a UE not receiving a GNSS signal directly, priority between the SLSS and an existing SLSS may be preset or indicated by signaling of the eNB. The priorities of the SLSSs may be signaled on a PSBCH so that the priorities may be transmitted even to out-of-coverage UEs.

Now, various embodiments of a synchronization method and procedure for enabling reliable communication between a V-UE and a P-UE will be described below.

Method 1 to Method 3 are for a case where the P-UE does not turn on a GPS application.

Method 1—A case where a P-UE transmits an SLSS based on a cellular timing or a GPS timing.

If the P-UE does not turn on a GPS application, the P-UE may determine a timing at which a D2D signal is to be transmitted, based on the latest turn-on time of the GPS application. For example, a UE which has recently turned on a GPS application and received a GPS signal successfully may determine whether to transmit a D2D signal based on a GPS timing or a cellular timing according to the difference between the corresponding time and a current time or the difference between the GPS timing and the cellular timing.

If the difference between the time of receiving the GPS signal successfully and the current time is equal to or larger than a predetermined threshold, the D2D signal is transmitted based on the cellular timing, and if the difference is less than the threshold, the D2D signal is transmitted based on the GPS timing. The threshold may be signaled by the network or preset.

If a time of transmitting the D2D signal is apart from the reception time of the GPS signal by a predetermined threshold or more, the P-UE may transmit an SLSS and the D2D signal based on the cellular timing, determining that the timing of the GPS signal is incorrect.

When receiving the GPS signal, the P-UE may calculate the difference between the timing of the GPS signal and the cellular timing. If the calculated difference is larger than a predetermined threshold, the P-UE may transmit the SLSS in pre-defined SLSS resources in a predetermined period. The threshold may be signaled by the network or preset.

If the P-UE does not execute the GPS application within a predetermined time or does not have a GPS reception capability in an extreme case, the P-UE may always transmit a cellular timing-based SLSS, assuming that the P-UE has not received a GPS signal. Or the P-UE may be pre-configured to transmit a cellular timing-based SLSS all the time. If the P-UE operates in a vehicle (V) mode, for example, the P-UE is connected to a vehicle, even the P-UE may follow the following SLSS transmission rule for a V-UE.

When the P-UE transmits the cellular timing-based SLSS, SLSS resources and an SLSS ID may be preset or configured by the network.

The SLSS transmission of the P-UE may be indicated by a physical-layer signal or a higher-layer signal by an eNB or an RSU, or only UEs having the RSRPs of signals received from the eNB or the RSU equal to or less than (less than) a predetermined threshold may selectively transmit SLSSs. The purpose of transmitting an SLSS by a P-UE is to allow an adjacent V-UE to perceive the existence of the P-UE. In this case, the P-UE may transmit the SLSS in a predetermined period even though the P-UE does not transmit data.

Method 2—A case where a P-UE intermittently wakes up and receives a GPS signal.

If the P-UE does not turn on the GPS application or a predetermined time has elapsed from the last time of turning on the GPS application, the P-UE may receive a GPS signal in a predetermined period by turning on a GPS circuit for the purpose of tracking the GPS timing. In this method, the P-UE basically transmits a D2D signal and an SLSS based on the GPS timing. To this end, the P-UE wakes up at every predetermined interval or a time interval configured by the network and receives a GPS signal. Because a GPS signal is received just for the purpose of acquiring the GPS timing rather than for the purpose of location estimation, the GPS timing may be estimated by acquiring GPS time information included in a navigation message of one GPS signal even in an extreme case in which only the single GPS signal is received, without the need for searching for all of a plurality of GPS signals.

A GPS timing valid time for estimation of the GPS timing may be defined. The GPS timing valid time may be defined as a time after the last time of turning on the GPS application or the last time of receiving timing information from a GPS. If this valid time exceeds a predetermined threshold, the P-UE may notify a higher layer of the need for receiving a GPS signal, or may estimate the GPS timing accurately by intermittently receiving a GPS signal before the valid time exceeds the predetermined threshold. As the P-UE directly estimates a GPS timing intermittently in this method, a timing may be aligned between the P-UE and the V-UE.

If the P-UE estimates an accurate GPS timing, the P-UE may transmit a GPS timing-based SLSS and D2D signal. For example, the P-UE may transmit an SLSS in the same SLSS transmission rule as applied to the V-UE.

In the case where the P-UE is to receive an SLSS from the V-UE, SLSS resources and an SLSS ID transmitted by the V-UE may be signaled to the P-UE by a physical-layer signal or a higher-layer signal. The P-UE may search for the SLSS in the corresponding resources.

Method 3a—A case where a V-UE transmits an SLSS based on a GPS timing.

A method for transmitting an SLSS at a predetermined subframe offset position in a predetermined period to a P-UE which never turns on a GPS circuit or a P-UE having no GPS reception capability by a V-UE is proposed. The V-UE may transmit an SLSS at a predetermined resource position based on a GPS timing, and the network may signal a window value indicating that the SLSS is transmitted within +/−w from an SLSS transmission offset in order to reduce the complexity of searching for the SLSS transmitted by the V-UE in the P-UE. A serving cell or camping cell of the P-UE may signal the transmission period and offset of the SLSS transmitted by the V-UE with respect to SFN 0 of the serving cell or camping cell to the P-UE. If the eNB or RSU is also capable of receiving a GPS signal, the eNB or RSU may signal a small w value, thus reducing the complexity required for searching for the SLSS of the V-UE in the P-UE. On the contrary, if the eNB or RSU is not capable of receiving a GPS signal, the eNB or RSU may signal a larger w value because the eNB or RSU may have only rough timing information.

All V-UEs may not transmit an SLSS. Rather, V-UEs capable of transmitting an SLSS may be restricted to V-UEs having GPS measurement qualities equal to or higher than a predetermined threshold. This is done to increase a timing accuracy by allowing only a UE having high reliability to transmit an SLSS. The threshold may be preset or configured by the network.

Or all V-UEs transmitting data may be allowed to transmit an SLSS. This is done to enable the P-UE to receive an SLSS and thus estimate more accurate synchronization irrespective of when the P-UE wakes up.

Or the network or RSU may indicate SLSS transmission to the V-UE by a physical-layer signal or a higher-layer signal. Since there is a possibility of a P-UE existing around the RSU or eNB having knowledge of an ambient environment or regional characteristics, the network or RSU indicates SLSS transmission to the V-UE. This method is advantageous in that unnecessary transmission of an SLSS from a V-UE is prevented in an environment without a P-UE in the neighborhood.

Method 3b—A case where a V-UE transmits an SLSS/D2D signal based on a cellular timing.

The V-UE may measure a GPS timing and a cellular timing. If the difference between the GPS timing and the cellular timing is equal to or larger than a predetermined threshold, the V-UE may transmit an SLSS based on the cellular timing. In this method, the V-UE measures the cellular timing and if the cellular timing is different from the GPS timing by the predetermined threshold or more, transmits a cellular timing-based D2D signal/SLSS to a P-UE. This method is advantageous in that an additional complexity of receiving a GPS signal at the P-UE is not increased. An SLSS resource and D2D resource pool transmitted by the V-UE may be signaled in advance to the P-UE. The period and offset of SLSS resources may be signaled with respect to SFN 0 of a serving cell. Herein, the network may signal to the P-UE a window value w indicating that the SLSS is transmitted within +/−w from the SLSS transmission offset in order to reduce the search complexity of the P-UE.

All V-UEs may not transmit an SLSS. Rather, V-UEs capable of transmitting an SLSS may be restricted to V-UEs having GPS measurement qualities equal to or higher than a predetermined threshold. This is done to prevent unnecessary SLSS reception of P-UEs camped on the eNB, caused by SLSS transmission of a UE at a network boundary. The threshold may be preset or configured by the network.

Or all V-UEs transmitting data may be allowed to transmit an SLSS. This is done to enable the P-UE to receive an SLSS and thus estimate more accurate synchronization irrespective of when the P-UE wakes up.

Or the network or RSU may indicate SLSS transmission to the V-UE by a physical-layer signal or a higher-layer signal. Since there is a possibility of a P-UE existing around the RSU or eNB having knowledge of an ambient environment or regional characteristics, the network or RSU indicates SLSS transmission to the V-UE. This method is advantageous in that unnecessary transmission of an SLSS from a V-UE is prevented in an environment without a P-UE in the neighborhood.

This method is applicable only to specific information such as an alarm message that the V-UE transmits for the P-UE. In general communication between V-UEs, when a V-UE transmits a signal for a P-UE based on a GPS timing, the V-UE uses a timing for the P-UE, thereby facilitating the P-UE to detect/decode a signal of the V-UE.

Method 3c—A case where a V-UE transmits an SLSS based on a cellular timing.

The V-UE may transmit only an SLSS at a cellular timing and then transmit D2D data at a GPS timing. Herein, to indicate the GPS timing to a receiving UE, the V-UE may signal, to the P-UE, an offset value between the GPS timing and the cellular timing, or the difference between the starting point of SFN0 set based on the GPS timing and the starting point of SFN0 set based on the cellular timing by a physical-layer signal or a higher-layer signal. For example, the offset value between the V-UE and the GPS timing may be signaled by a PSBHC reserved bit. In another example, a channel in which the V-UE transmits a kind of control information or some data information to the P-UE (e.g., a new PSCCH format) may be defined separately, and the offset value between the cellular timing and the GPS timing may be signaled on the channel. According to this method, the existence of the V-UE is indicated to the P-UE by transmitting an SLSS based on the cellular timing, and then a timing offset for transmission of the V-UE is transmitted on a PSBCH or another sidelink channel so that the P-UE may determine a position at which the V-UE transmits a packet. This method is advantageous in that a P-UE may receive a signal from a V-UE without increasing the complexity of the P-UE. Or the V-UE may transmit an SLSS and an additional physical channel (e.g., PSCCH) at the cellular timing and directly signal a GPS timing value (e.g. by expressing the starting point of SFN0 as a UTC time) on the physical channel transmitted at the same timing as the SLSS.

Meanwhile, this method may not be for a P-UE only. This method may also be helpful to a V-UE which has failed to receive a GPS signal. The V-UE which has failed to receive a GPS signal may also receive an SLSS at the cellular timing, and receive GPS timing information (or timing offset information) transmitted at the same timing as the SLSS, for use in later reception of a packet.

Meanwhile, resources in which the V-UE transmits an SLSS may have the same period as resources in which the P-UE receives an alarm message in Methods 3a, 3b, and 3c. This is done to enable the P-UE to efficiently receive an SS by transmitting the SS at a position where the P-UE always wakes up and receives a signal. Herein, the alarm message reception period refers to a resource area in which the P-UE is configured to always wake up and receive specific data transmitted by the V-UE, the RSU, or another P-UE.

Since an operation for transmitting a signal to the V-UE or receiving a message from the V-UE takes place intermittently in an event-triggered manner from the viewpoint of the P-UE, searching for an SS of the V-UE all the time by the P-UE may be inefficient. Therefore, the P-UE wakes up and searches for an SLSS of the V-UE in predetermined resources, or wakes up intermittently and receives a GPS signal, thereby maintaining only synchronization to enable immediate Tx/Rx. In this manner, the P-UE may reduce its battery consumption.

Method 3d—An eNB or RSU transmits a PSS/SSS or an SLSS. Herein, the eNB or RSU, which is capable of acquiring GPS synchronization, may indicate to a P-UE or a V-UE which has lost a GPS signal whether the GPS synchronization has been acquired by a physical-layer signal or a higher-layer signal. In this case, the P-UE or V-UE which has not received a GPS signal may transmit and receive a D2D signal based on the timing (cellular timing) of the PSS/SSS or SLSS transmitted by the eNB or RSU, without the need for additionally receiving a GPS signal.

Method 4—A case where a P-UE turns on a GPS application.

The P-UE may transmit and receive a D2D signal at a GPS timing in a resource pool signaled by a serving cell or camping cell. In this case, since the P-UE has knowledge of the accurate GPS timing, the P-UE may advantageously operate at the same timing as the V-UE.

Method 5 and Method 6 are especially for the out-of-coverage case.

Method 5—A V-UE transmits an SLSS for an out-of-coverage P-UE.

If a P-UE is out of coverage, the P-UE should basically search for an SLSS in all resources. In this case, an adjacent V-UE may also be out of coverage. If the V-UE is out of coverage, the V-UE may transmit an SLSS at a predetermined SLSS resource position based on a GPS timing, using a randomly selected SLSS ID or a predetermined SLSS ID.

The SLSS resource position, period, and SLSS ID of the SLSS transmitted by the V-UE may be preset V-UE-commonly. All V-UEs may transmit an SLSS or only a part of the V-UEs may transmit an SLSS. For example, only a V-UE which is to transmit data may transmit an SLSS. V-UEs allowed to transmit an SLSS may be restricted to a V-UE which has turned on or updated the GNSS within a predefined threshold time or a V-UE having a GNSS measurement quality equal to or higher than a predetermined value. Or only a V-UE which has detected an SLSS transmitted by a P-UE may transmit an SLSS. For this operation, the V-UE should search for an SLSS of a P-UE at a usual time.

Method 6—A P-UE transmits an SLSS for a V-UE.

If a P-UE has not turned on a GPS application during a time period exceeding a predefined threshold or has a GPS measurement quality equal to or lower than a predetermined value, the P-UE may be configured to transmit an SLSS (having a UE-selected SLSS ID or a predetermined SLSS ID) in predefined SLSS resources in a predetermined period. In the case where the P-UE selects an SLSS ID, a V-UE has no way to know the SLSS ID and thus should search all SLSS IDs. In the case the SLSS ID used by the P-UE is predetermined, the V-UE has only to detect the SLSS ID. This method is intended to indicate the existence of an adjacent P-UE by an SLSS and thus prevent a V-UE from transmitting an SLSS unnecessarily.

Method 7—Differentiation between SLSSs transmitted at different timings.

A D2D UE transmitting a signal at a cellular timing and a D2D UE transmitting a signal at a GPS timing may co-exist. Herein, SLSSs transmitted by the two different UEs need to be distinguished from each other at the physical layer.

Method 7-1) Differentiation using PSSS and/or SSSS root sequence

An SLSS sequence used by a V-UE may be distinguished from an SLSS sequence used by a P-UE. For example, the V-UE may transmit an SLSS using a PSSS root sequence ID unused by the P-UE. Herein, the root sequence ID used by the P-UE may be one used for D2D in the legacy LTE Release 12/13, or may be a new root sequence ID which has not been used for a P-UE in the legacy D2D. A root sequence ID different from that of the P-UE and the root sequence ID used for the legacy D2D may be configured for the V-UE.

Meanwhile, a PSS for a legacy DL uses ZC sequences of root indexes 25, 29, and 34, and a PSSS of a sidelink uses ZC sequences of root indexes 26 and 37. Herein, it is proposed that a D2D UE transmitting a signal based on a GPS timing uses a ZC sequence of root index 38. Since the ZC sequence of root index 38 is in a complex conjugate relationship with the ZC sequence of PSS root index 25 used for the legacy DL, an existing DL ZC sequence receiver may be re-used. Further, if a UE transmitting an SLSS based on the GPS timing co-exists with a legacy D2D UE, the legacy UE does not detect a GPS-based SS, which enables the co-existence.

Method 7-2—Differentiation using a PSBCH

A timing at which an SLSS is transmitted or a UE which transmits the SLSS may be indicated in some PSBCH reserved bit. For example, the coverage indicator may be set to different values for a UE transmitting a signal based on a cellular timing and a UE transmitting a signal based on a GPS timing. Or different SLSS transmission timings may be indicated by setting the PSBCH reserved bit to different values.

Method 7-3—Different periods/resource positions are set along with the above two methods.

For example, a transmission period may be set to be longer than a legacy transmission period, 40 ms for a D2D UE using the GPS as a timing reference. Or an SLSS transmission period may be set to be different according to a specific event or regional characteristics. For example, if an accident occurs between vehicles, the SLSS transmission period may be increased. Or the transmission period may be increased in the presence of an underground parking lot or tunnel in the neighborhood. Or although the same period is used, a part of 40-ms SLSS resources may be distinguished as resources transmitted by a UE using the cellular timing.

Although the above differentiation method may be implemented differently for different SLSS transmitting timings (cellular timing or GPS timing), the differentiation method may also be implemented differently depending on an SLSS transmission entity. For example, all or a part of sequence/PSBCH reserved bit/SLSS resource period/SLSS transmission resource position may be set to be different for SLSSs transmitted by a P-UE and a V-UE. Further, a part of the foregoing methods may be used as a method for distinguishing an SLSS transmitted by an RSU from an SLSS transmitted by any other UE.

Now, a description will be given of a method for establishing initial frequency synchronization.

Method 8

Although time synchronization is established based on the GPS timing, it may be preferable to acquire frequency synchronization using SLSSs or D2D RSs transmitted between two UEs. Herein, it is most preferable to acquire frequency synchronization for an initial D2D signal reception, using a PSS/SSS/CRS/CSI-RS/DMRS of a cellular network in the in-coverage case. It is because unless frequency synchronization is established for the initial D2D signal reception, the D2D signal reception performance is degraded significantly. Accordingly, it is preferred that a UE basically pre-acquires frequency synchronization using an RS (with a relatively small frequency offset) transmitted by a fixed node such as an eNB or RSU. For example, while a P-UE may set a timing based on an SLSS transmitted by a V-UE or using a GPS timing, the P-UE may acquire initial frequency synchronization with the cellular network.

Method 9

A method for using frequency synchronization of a GPS signal may be considered for an out-of-coverage UE which cannot detect a signal from the network. A GPS receiver basically tracks frequency synchronization by comparing a received pseudorandom noise (PRN) code with a receiver-generated PRN code. An oscillator may be corrected in a band in which D2D communication takes place, using the frequency synchronization value. This method may be restrictively used only in the case where the D2D communication band is within a predetermined frequency spacing from a GPS band (e.g., 1.575 GHz or 1.227 GHz). Even though the GPS frequency synchronization has been tracked accurately, if a carrier moves a lot, the accuracy of the GPS frequency synchronization may be decreased. Thus, a band in which GPS frequency synchronization is available may be preset.

Method 9b

It may be regulated that a V-UE and/or a P-UE transmitting and receiving a V2X message should always transmit a message in frequency synchronization with the GPS. In this method, a message is transmitted based on the GPS frequency synchronization irrespective of coverage states and the type of the message transmitted by a UE. The GPS frequency synchronization is used even in a carrier in which a cellular signal is transmitted. Considering that a UE is generally likely to have one oscillator, if frequency synchronization is changed in transmitting a V2X message or a cellular message (Uu), this may increase the implementation constraint of the UE due to the dynamic frequency reference change. Thus, the GPS frequency synchronization is always used. Further, as an eNB without a GPS receiver is configured to follow the GPS frequency synchronization, the frequency error between the GPS and the eNB may be reduced. Herein, the UE may signal a frequency synchronization that the UE has used to the eNB by a physical-layer signal or a higher-layer signal. For example, when the V-UE sets the GPS as a frequency reference, the V-UE may notify the eNB that the GPS is set as a frequency reference by a PSBCH reserved bit or by setting an existing field to a different value.

Method 9c

Meanwhile, if a UE which transmits a signal based on GPS frequency synchronization fails to receive a GPS signal in method 9b, the UE may use eNB frequency synchronization as a fallback. If the UE fails to acquire the eNB frequency synchronization, the UE may acquire frequency synchronization with a D2D signal transmitted by a UE which has received a GPS signal. If the UE also fails to acquire the frequency synchronization with the D2D signal transmitted by the GPS-receiving UE, the UE may use its local oscillator. Herein, to indicate a frequency synchronization which the UE has acquired to another UE, the UE may set a different SLSS sequence ID, different SLSS resources, a different D2D signal transmission resource area, or some field of a PSBCH to a different value. Or a combination of the foregoing methods may fall within the scope of the present disclosure.

Method 10

It may occur that a UE out of network coverage cannot acquire accurate frequency synchronization because it fails to receive a GPS signal around it or there is no device transmitting a signal continuously, such as an eNB. In this case, a tighter frequency offset requirement than for other UEs may be set for the UE so that the frequency of the UE may not be deviated by a predetermined threshold or above at an initial transmission. Particularly, since a V-UE is highly likely to have a more expensive transceiver than a P-UE, a tighter frequency offset requirement may be set for the V-UE so that at least a frequency offset generated in the V-UE may be reduced. Or if an RSU is a UE type, a tighter frequency offset requirement than for other UEs may be set for the RSU to thereby help adjacent UEs with frequency synchronization (if the RSU is an eNB type, the RSU will follow a frequency offset requirement for an eNB). A method for using additional SLSS resources/SLSS ID/sequence to indicate receiving UEs that a UE has a tighter frequency offset requirement than for other UEs, or signaling information indicating the type/frequency requirement/frequency synchronization priority of the UE on an additional physical channel (e.g., a PSBCH or any other channel) by the UE is proposed. Even though a receiving UE detects a plurality of types of SLSSs/D2D signals, the receiving UE is frequency-synchronized with a D2D signal of a UE having a higher priority for corresponding information. Meanwhile, for a V-UE, mobility may increase and thus, it may be inappropriate to set frequency synchronization as a reference. Therefore, it may be regulated that only a fixed node such as an RSU, a V-UE having a speed equal to or lower than a predetermined value, a UE having a relative speed equal to or lower than (lower than) a predetermined speed, with respect to a receiving UE, or a UE having a tighter frequency offset requirement than other UEs is set as a frequency synchronization reference, selectively or with priority. For this operation, for an SLSS transmitted by a UE satisfying the foregoing condition, a different ID may be set, transmission resources may be separately configured, a different root sequence may be used for a PSSS/or an SSSS, a PSBCH reserved bit may be set differently, or an indicator may be transmitted on an additional physical channel. For example, a V-UE moving at or below a predetermined speed may transmit information about its transmission speed on the PSBCH or another physical channel, and use a different SLSS ID according to the speed.

Method 11

Frequency synchronization settings may be prioritized preliminarily. For example, frequency synchronizations may be prioritized preliminarily in the order of eNB of cellular network >frequency synchronization of GPS signal >V-UE or RSU (having a tighter frequency synchronization requirement than other UEs) >D2D signal transmitted by UE within network coverage >D2D signal transmitted by out-of-coverage UE, and it may be regulated that although a UE may receive a plurality of signals, the UE should acquire frequency synchronization according to the preset priority order. A part of the embodiments of frequency synchronization prioritization may be excluded and the priority order of frequency synchronizations may be changed. Further, the prioritization may be applied to time synchronizations, not limited to frequency synchronizations. Time synchronizations and frequency synchronizations may be prioritized in the same manner or in different manners. For example, the priorities of time synchronizations may be set in the order of GPS >UE using GPS as reference, eNB, or RSU >signal transmitted by UE having mobility within predetermined threshold from among UEs using GPS as reference or UE-type RSUs >eNB asynchronous with GPS >UE within coverage of eNB asynchronous with GPS >UE which has failed to receive any of signals of GPS/eNB/eNB synchronized with eNB. The priority order of time and/or frequency synchronizations may be pre-signaled by a physical-layer signal or a higher-layer signal by the network.

Meanwhile, on the assumption that a frequency error of a UE synchronized with the GPS is within 0.05 ppm, the frequency error is lower than a frequency offset requirement 0.1 ppm for a UE synchronized with an eNB. Thus, it is preferable to synchronize with the GPS first of all. In this aspect, the GPS has a highest priority, and a signal transmitted by a UE synchronized with the GPS may have the next priority.

Meanwhile, an SLSS transmitted by a UE having a poor GPS signal reception performance may cause interference to another UE receiving the SLSS or a UE receiving a GPS signal normally. To avert this problem, Method 12 may be used.

Method 12—Transmission power of an SLSS is controlled according to a GPS measurement quality.

In Method 12, a UE having a good GPS measurement quality transmits an SLSS with higher power, and a UE having a poor GPS measurement quality transmits an SLSS with lower power. If a GPS measurement quality is equal to or lower than a predetermined threshold, an SLSS may not be transmitted in an extreme case. In a more specific embodiment, for example, SLSS transmission power may be determined by i) P_SLSS=min(P_SLSS_max, P0+alpha* (GPS measurement quality)), ii) P_SLSS=P_SLSSTxpw*delta(GPS measurement quality>threshold), iii) setting transmission power of P_SLSS in multiple steps, and determining the steps according to a measurement quality. Herein, the measurement quality may be a GPS measurement quality, and P0 and alpha may be constants preset or signaled by the network. The proposed method is intended to reflect a measurement quality in setting SLSS transmission power. This may be implemented in the form of controlling SLSS transmission power according to a synchronization error. For example, a UE having or expected to have a large synchronization error transmits an SLSS with low power, and a UE having or expected to have a small synchronization error transmits an SLSS with high power. For example, a UE receiving a GPS signal directly transmits an SLSS with high power, expecting a small synchronization error, whereas a UE that fails to receive a GPS signal directly or is synchronized with an SS of an eNB transmits an SLSS with low transmission power, expecting a large synchronization error. More specifically, SLSS transmission power may be determined by Min(P0, Pmax-alpha*(measurement error)) being a modification to the above method. All or a part of P0, Pmax, and alpha may be preset or signaled by a physical-layer signal or a higher-layer signal by the network.

In another embodiment, SLSS transmission power may be determined in the following manner.

P1 if measurement error <a1
P2 if a1<=measurement error <a2
P3 if a2<=measurement error <a3
. . .
PN if aN-1<=measurement error <aN Herein, parameters such as N, an, and Pn may be preset or signaled by a physical-layer signal or a higher-layer signal by the network.

Meanwhile, a specific method for measuring a GPS measurement quality/error is proposed below.

The reception power of a preamble/known sequence among GPS signals may be considered as a factor of a measurement quality. A hop count for GPS synchronization may be considered as a factor of GPS measurement. For example, a hop count of 0 is considered for a UE receiving a GPS signal directly, a hop count of 1 is considered for a UE synchronized with an SLSS that an eNB or RSU transmits by receiving a GPS signal and synchronizing with the GPS signal, and a hop count of 2 is considered for a UE synchronized with an SLSS transmitted by a UE synchronized with an SLSS. It may be assumed that as the hop count increases, a certain bias is imposed on a measurement, thus causing a larger measurement error.

A time after GPS synchronization is missed may be reflected in a measurement quality. An offset may be applied, determining that as a time increases after GPS synchronization is missed, the measurement quality decreases or a measurement error increases. The size of the offset may be determined in proportion to the time or may be determined to be a constant (discontinuous function) determined according to the length of a GPS-lost time period.

A GPS measurement quality or error may be measured by all or a part of the above-described methods in combination, and SLSS transmission power may be determined based on the measurement.

Meanwhile, the foregoing SLSS transmission power determination method may be used as a method for determining the transmission power of a message transmitted by a V-UE. For example, if it is determined that a synchronization quality is low or a synchronization error is large, the transmission power of a message is decreased, thus reducing interference with other UEs. Or if it is determined that a synchronization quality is low or a synchronization error is large (or if it is determined that the measurement error exceeds a predetermined threshold), it may be regulated that the corresponding UE should transmit an SLSS and/or a message in separate resources/resource area. This is done to enable the corresponding V-UEs to transmit signals in separate resource areas because they are asynchronous with other V-UEs so that interference with or from the other V-UEs may be decreased.

The foregoing frequency synchronization establishment method may be extended as an SS selection method. That is, the proposed method is applied to timing as well as frequency. The frequency synchronization establishment method may be used in conjunction with one of time synchronization establishment methods.

PLMN and Selection of Synchronization Source

Hereinbelow, a description will be given of PLMN-related prioritization in relation to the above-described prioritization of synchronization sources.

Figure 11:
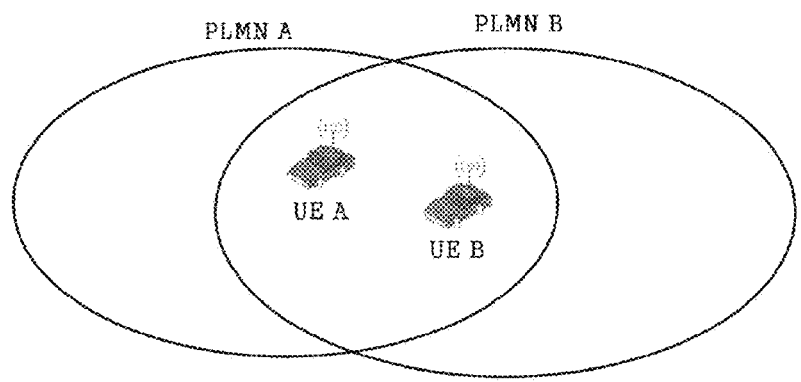
FIG. 11 is a view illustrating PLMNs and exemplary selection of a synchronization source.
Figure 12:
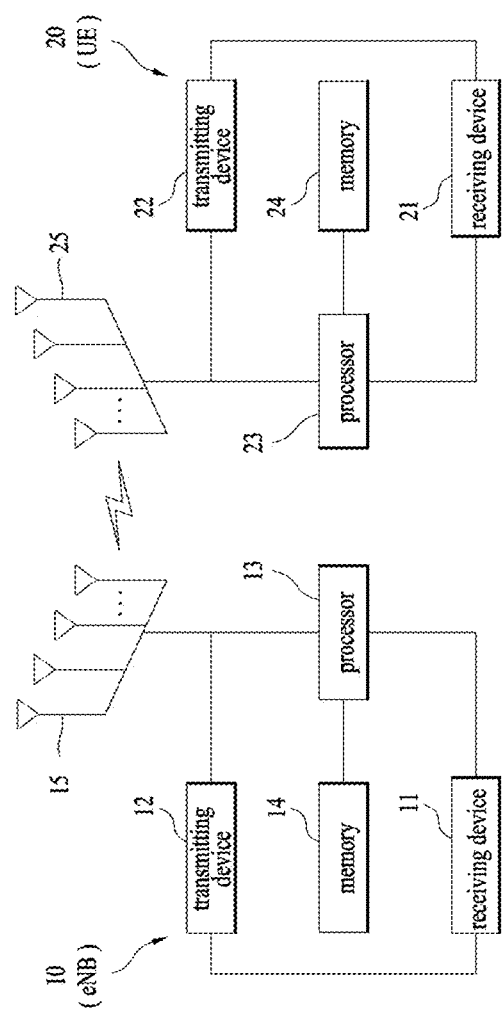
FIG. 12 is a block diagram of a transmission apparatus and a reception apparatus.

FIG. 11 illustrates an example referred to for describing PLMN-related prioritization in V2V. As illustrated, it is assumed that UE A and UE B conducting V2V communication with each other are located in a common area between PLMN A and PLMN B. It is also assumed that the GNSS has priority over an eNB in PLMN A, and an eNB has priority over the GNSS in PLMN B. In this case, if UE A and UE B prioritize synchronization sources to select a synchronization source, irrespective of PLMNs, a problem may be produced. Specifically, in the case where even though UE A and UE B belong to PLMN A, UE A receives a PSBCH related to PLMN A and thus selects the GNSS having a higher synchronization source priority level as a synchronization source, and UE B receives a PSBCH related to PLMN B and thus selects the GNSS having the higher synchronization source priority level as a synchronization source, UE A and UE B apply different priority levels to synchronization sources and also select different synchronization sources in spite of belonging to the same PLMN. In this case, UE A and UE B, which are synchronized to the GNSS and the eNB, respectively, have as much a synchronization difference as the timing difference between the GNSS and the eNB. If two UEs conducting V2V communication with each other have a synchronization difference, a safety problem may be produced.

Therefore, to solve the above problem, a UE according to an embodiment of the present disclosure may receive a physical sidelink broadcast channel (PSBCH), determine which one between the GNSS and an eNB is to be selected as a synchronization source according to priority information included in the PSBCH, and then receive an SLSS related to the determined synchronization source. Herein, the UE may determine that the priority information is valid only if a public land mobile network (PLMN) related to the priority information is identical to a PLMN to which the UE belongs. The PSBCH may include a PLMN ID. Further, the SLSS related to the synchronization source may be received directly from the synchronization source or from the synchronization source through another UE which has received the SLSS.

The above configuration may prevent UE A and UE B from receiving PSBCHs related to different PLMNs, applying different priority levels to synchronization sources, and thus selecting different synchronization sources (the GNSS and the eNB) in FIG. 11. Since UE B has received the PSBCH related to PLMN B, UE B may determine that priority levels indicated by the PSBCH are not valid and thus may not apply the priority levels. Then, UE B may receive the PSBCH related to PLMN A to which UE B belongs and apply priority levels indicated by the PSBCH in selecting a synchronization source, thereby acquiring the same synchronization source as UE A.

Method for Transmitting Synchronization Signal by UE, in the Case where UE Selects GNSS as Synchronization Source Now, a description will be given of transmission of a synchronization signal from a UE which has received an SLSS, in the case where the UE selects the GNSS as a synchronization source. In the following description, selection of the GNSS as a synchronization source may result from, not limited to, prioritization based on match between PLMNs. That is, the following description may also apply to the case of selecting the GNSS as a synchronization source, aside from the afore-described prioritization.

If the UE receives an SLSS for which the GNSS serves as a synchronization source, the UE may always transmit the SLSS. If UEs select an eNB as a synchronization source, legacy LTE Release 12/13 synchronization signal transmission requirements may be conformed to. As the GNSS is introduced as a new synchronization source, UEs synchronized to the GNSS may transmit a synchronization signal to provide timing information to other UEs. UEs, which have secured predefined, sufficiently satisfactory synchronization reception capabilities, may set the GNSS as a synchronization reference. These UEs may always transmit an SLSS in predetermined resources or resources indicated by a network. Herein, if SLSS resources are not configured, the synchronization signal transmission may be impossible.

If the GNSS is set as a synchronization reference, an SLSS ID may be preset. It may be regulated that a UE which has received the SLSS ID does not relay the SLSS. This is because there is no need for separately configuring resources for relaying a GNSS-based synchronization signal, and on the assumption that if a UE receives a GNSS signal at least once, a corresponding clock may be maintained for long in most cases, there is no need for additional synchronization relaying.

If the UE receives the SLSS for which the GNSS servers as a synchronization source, the UE may transmit the SLSS for a predetermined time even though the UE loses GNSS reception. That is, it may be regulated that once a UE receives a GNSS signal successfully, the UE transmits an SLSS for a predetermined time even though the UE loses GNSS reception. Although the UE loses GNSS reception, the UE may maintain a corresponding clock for a predetermined time. Therefore, the UE is allowed to transmit the SLSS at least for the predetermined time during which the clock is maintained and thus help another UE which fails in GNSS reception to acquire synchronization. A timer length during which the SLSS may be transmitted in the case of GNSS reception failure may be preset or signaled by a physical layer signal or a higher layer signal by the network.

Or a UE configured to have a better capability of maintaining a clock after GNSS reception may transmit an SLSS for a longer timer. For this purpose, it may be determined whether to transmit an SLSS according to a GNSS reception quality. This is to determine whether to transmit the SLSS on the basis of not a GLSS lost time but a timing error. This is advantageous in that certain performance can be ensured even though UEs maintain GNSS clocks for different time periods. The timing error used to determine whether to transmit the SLSS may be preset or signaled by a physical layer signal or a higher layer signal by the network.

In another method, among UEs which have succeeded in GNSS reception, a UE having an RSRP of a signal from an eNB equal to or larger than a first threshold and less than a second threshold may be configured to transmit an SLSS with an ID reserved for the GNSS. Herein, the first or second threshold may be infinity. This implies that the network allows UEs which have succeeded in GNSS reception and are located at predetermined positions within network coverage to transmit a GNSS-based synchronization signal.

In another method, whether UEs which have succeeded in GNSS reception are to transmit an SLSS may be indicated by a physical layer signal or a higher layer signal by the network. The network may prevent unnecessary synchronization signal transmission or protect a Uu operation by controlling/determining whether UEs within cell coverage are to transmit an SLSS. Or, on the contrary, the network may force UEs, which have succeeded in GNSS reception, to transmit an SLSS, thereby making a V2V operation smooth.

Meanwhile, the network may control SLSS/PSBCH transmission in coverage. If the eNB is configured to give priority to an eNB timing, an LTE Release 12/13 D2D mechanism may be reused. That is, it is network signaling or an RSRP threshold, which triggers an SLSS/PSBCH transmission. In the case where the eNB is configured to give priority to a GNSS timing, if a UE has the GNSS timing with 'sufficient reliability', the UE may be configured to always transmit an SLSS/PSBCH, in order to minimally affect the legacy standard. The meaning of 'sufficient reliability' may be discussed in RAN4. In the case of out-coverage, the LTE Release 12/13 SLSS/PSBCH transmission requirements may be reused. Further, if a UE has a GNSS timing with sufficient reliability, the UE may always transmit an SLSS/PSBCH.

In summary, i) for an in-coverage UE, if the eNB gives priority to the eNB timing over the GNSS timing, the LTE Release 12/13 mechanism for SLSS/PSBCH transmission is reused. ii) For an in-coverage UE, in the case where the eNB gives priority to the GNSS timing over the eNB timing, if a UE has a GNSS timing with sufficient reliability, the UE always transmits an SLSS/PSBCH, iii) For an out-coverage UE, the LTE Release 12/13 SLSS/PSBCH transmission mechanism is reused. Further, if the UE has the GNSS timing with sufficient reliability, the UE always transmits an SLSS/PSBCH.

In LTE Release 12/13, one synchronization resource is configured for an in-coverage UE, and two synchronization resources are configured for an out-coverage UE. In V2V, if UEs select the GNSS as a timing reference, one more synchronization resource may be additionally configured for the in-coverage UE. Although the GNSS may be regarded as a very wide cell, the GNSS is not capable of configuring synchronization resources. Thus, the eNB may configure SLSS resources on behalf of the GNSS.

When the eNB configures additional synchronization resources, a timing reference should be discussed. In LTE Release 12/13 D2D, all timing offsets are configured with respect to SFN 0. If the eNB has a GNSS reception capability, a subframe number (SFN) is aligned with a D2D frame number (DFN), and thus the eNB may configure an additional synchronization resource with respect to SFN 0. If the eNB does not have the GNSS reception capability, an SLSS timing misalignment occurs between cells. Since synchronization resources for the SLSS-based GNSS is for a GNSS cell, a reference timing should be relative to DFN 0. Particularly in an asynchronous scenario, it is favorable to have a common SLSS transmission timing.

In summary, in the case where the eNB configures SLSS resources for a GNSS timing with respect to SFN 0, a timing misalignment may occur between cells in an asynchronous network. Therefore, i) two synchronization resources may be configured for an in-coverage UE. One of the synchronization resources is for eNB-based SLSS/PSBCH transmission, and the other is for GNSS-based SLSS/PSBCH transmission. ii) For the GNSS-based SLSS/PSBCH transmission for the in-coverage UE, the synchronization resources are configured with respect to DFN 0.

For an out-coverage UE, two resources may be configured with respect to DFN 0. For GNSS-based synchronization, one of the two resources may be configured for SLSS transmission for a UE synchronized directly to the GNSS, and the other resource may be configured for SLSS transmission for a UE synchronized indirectly to the GNSS. In the case where the UE does not select the GNSS as a timing reference, if the UE selects another UE as a synchronization reference, one of the two resources is used for SLSS transmission, and the other resource is used for SLSS tracking.

Meanwhile, unlike the above method, for in-coverage, the network may also configure two synchronization resources for the GNSS. One of the synchronization resources is for a UE receiving the GNSS directly, and the other synchronization resource is for SLSS transmission of a UE synchronized to a UE which has received the GNSS. This scheme is intended to transmit and receive a GNSS-based timing stably by allowing GNSS relay even within the network.

In the case of out-coverage, one or two separate SLSS resources may also be (pre)configured for the GNSS. This means that the resources are additionally allocated in order to prevent a probable resource collision with an independent synchronization source.

Method for Processing Resource Overlap Caused by Different Synchronization Sources Meanwhile, the network may configure a source pool by setting a synchronization source as a reference for the pool. That is, a synchronization source may be set for each resource pool. Herein, the synchronization reference of a specific resource pool may be the GNSS. If the GNSS is a reference, a corresponding resource pool bitmap may be interpreted with respect to DFN 0.

If SFN 0 being the eNB timing and DFN 0 are different in timing, subframes may partially overlap. When the network sets DFNs, a subframe to be used for a sidelink may overlap partially with a D (downlink) or S (special) subframe among cellular subframes. In this case, it is preferred to exclude the subframe overlapped with the corresponding subframe from a D2D resource pool. In this case, whether to exclude a subframe from sidelink subframes may depend on an overlap degree. In this context, the following methods may be considered.

If among cellular subframes, a subframe unavailable for a sidelink (e.g., a DL or special subframe, a sidelink subframe configured based on a cellular timing, or a synchronization subframe) is overlapped at least partially, the whole corresponding subframe is excluded from sidelink transmission. In this method, a DL subframe at the cellular timing overlaps with two DFN-based UL subframes, the two UL subframes are excluded from sidelink subframes.

If among cellular subframes, a subframe unavailable for a sidelink is overlapped to a degree equal to or larger than a predetermined threshold, the corresponding whole subframe is excluded from sidelink transmission. In this method, even though a subframe is overlapped partially, the subframe is not always excluded. Rather, if a subframe is overlapped to a degree equal to or larger than the predetermined threshold, the subframe is excluded. The overlap threshold may be set differently depending on whether a DFN-based subframe is overlapped at the start or end. For example, if the end of a sidelink subframe is overlapped, it does not matter whether an area corresponding to the last symbol of the sidelink subframe overlaps with a cellular subframe because the last symbol of the sidelink subframes is not used. However, it may be configured that if a sidelink transmitting UE affects a cellular subframe due to Tx/Rx switching, the corresponding area is not overlapped. In addition, a propagation delay may be reflected in the overall threshold according to a cell size. For example, even though the end of a sidelink subframe is overlapped by the length of an OFDM symbol without a Tx/Rx switching area, the sidelink subframe may be used continuously. The above two operations are performed to protect D and S subframes, when UEs within a cell conduct sidelink communication with respect to the GNSS.

A UE may acquire a subframe number/boundary/SFN boundary of an eNB within a cell, and DFNs based on this and the GNSS timing. The UE may recognize the difference between the two, and regard them as subframes unavailable as D and S subframes with respect to an SFN. Herein, if a subframe is partially overlapped in the above-described method, the corresponding subframe may be regarded as an unavailable subframe. A resource pool bitmap may be applied to the remaining subframes except for a subframe carrying a synchronization signal. Herein, the UE may recognize the difference between the SFN and the DFN differently according to the position of the UE. In an environment in which cells are large, each UE may recognize a different SFN area, and thus the position of an excluded subframe may be different for each UE. To avoid this phenomenon, the network may signal a timing offset between the SFN and the DFN by a physical layer signal or a higher layer signal. The SFN may be based on the transmission time of the eNB, and may be determined by an average SFN boundary of a UE within a cell. The UE may determine how much a DFN subframe and an SFN subframe are overlapped based on signaling indicating the difference between the SFN and the DFN, and thus commonly exclude a subframe. To provide this information to a UE outside the network coverage, the UE may signal offset information between the SFN and the DFN by a physical layer signal or a higher layer signal (e.g., some field of a PSBCH). If a UE within the cell sets the eNB timing as a synchronization reference, UEs using the DFN outside the eNB may not have accurate knowledge of information about a pool used by UEs within the eNB. If the pool information is signaled on a PSBCH, the UE may identify an SFN boundary with respect to a DFN. Herein, the UE may determine which subframes are D and S subframes and a synchronization subframe by using a TDD configuration in the cell, and set a resource pool bitmap by excluding these subframes.

Meanwhile, a specific TDD configuration may be preset for out-coverage UEs. Herein, on the assumption that the TDD configuration is a virtual cell, a resource pool bit map from which excluding D and S subframes are excluded may be applied. This may be an operation for protecting D and S in the virtual cell, regarding the virtual cell as TDD used by a UE in a nearby cell, if there is the UE in the nearby cell in a partial coverage situation, a UE within a cell uses TDD, and a TDD configuration is aligned with the preset TDD configuration. Herein, to perfectly protect the nearby TDD cell, if an offset between the SFN and the DFN is known from a PSBCH of another UE, or the difference between the SFN and the DFN is known preliminarily, corresponding out-coverage UEs may perform a sidelink subframe exclusion operation to protect D and S subframes which are partially overlapped. That is, an out-coverage UE expects that there is a nearby cellular UE, and thus preliminarily excludes subframes overlapped (at least partially) with D and S subframes by using a preset TDD configuration and offset information which is preset or acquired from another UE. Likewise, the out-coverage UE may also signal the offset between the used SFN and the DFN by a physical layer signal or a higher layer signal (e.g., some field (reserved) of a PSBCH) in order to indicate which offset has been used to a UE within the network coverage.

Meanwhile, UEs within the cell may accurately interpret a bitmap of a neighbor cell, only when the UEs are aware of the difference between an SFN of the neighbor cell and a DFN. For this purpose, the network may signal, to UEs, the difference between the SFN and the DFN in neighbor cells, or the difference between an SFN of a serving cell and an SFN of a neighbor cell by a physical layer signal or a higher layer signal. Further, the network may signal a TDD configuration and a synchronization subframe of the neighbor cell. Thus, it may be determined how many sidelink subframes are excluded in the neighbor cell, and the resource pool bitmap may be accurately applied.

Meanwhile, if the difference between the SFN and the DFN is equal to or larger than a predetermined value, the network may set an in-coverage UE to always prioritize a specific synchronization source. For example, it may be regulated that if the difference between the SFN and the DFN is equal to or larger than the predetermined value, the UE prioritizes an eNB timing over a GNSS timing.

UE Operation in the Case of Three Synchronization Resources

Table 6 below describes an operation of a UE, in the case of three synchronization resources.

TABLE 6

| UE synchronization state: | Resource 1 ("InC resource" or "1st OoC resource") | Resource 2 ("2nd OoC resource") | Resource 3 ("GNSS resource") | Notes |
|---|---|---|---|---|
| UE is InC, sync to eNB | SS from SS_net, PSBCH | | | R12/13 solution |
| UE is InC, sync to GNSS | Reserved SLSS ID, PSBCH | | | PSBCH used to protect cell-edge UEs. Note that PSBCH should be transmitted on the first resource to avoid interference with OoC GNSS UEs PSBCH. |
| UE is OoC, synchronized to InC UE with/without GNSS | SS from SS_netPSBCH with InC_flag = 0 | | | R12/13 solution |
| UE is OoC, synchronized to OoC UE with SS_net with/without GNSS | SS from SS_oonPSBCH with InC_flag = 0 | | | R12/13 solution |
| UE is OoC, synchronized to OoC UE with SS_oon and with/without GNSS | SS from SS_oonPSBCH with InC_flag = 0 (The sync resource is selected depending on the resource of the incoming sync source) | | | R12/13 solution |
| UE is isolated and without GNSS | SS from SS_oonPSBCH with InC_flag = 0 (Random sync resource) | | | R12/13 solution |
| UE is OoC, synchronized to GNSS | SS from SS_oonPSBCH with InC_flag = 0 (Random sync resource) | | Reserved SLSS ID, PSBCH | PSBCH only includes DFN-related fields. The third resource is needed to avoid interference to cell-edge UEs. |

TABLE 7

| UE synchronization state: | Resource 1 ("InC resource" or "1st OoC resource") | Resource 2 ("2nd OoC resource") | Resource 3 ("GNSS resource") | Notes |
|---|---|---|---|---|
| UE is InC, sync to eNB | SS from SS_net, PSBCH | | | R12/13 solution |
| UE is InC, sync to GNSS | Reserved SLSS ID, PSBCH | | | PSBCH used to protect cell-edge UEs. Note that PSBCH should be transmitted on the first resource to avoid interference with OoC GNSS UEs PSBCH. |
| UE is OoC, synchronized to InC UE without GNSS | | SS from SS_netPSBCH with InC_flag = 0 | | R12/13 solution |

TABLE 7-continued

| UE synchronization state: | Resource 1 ("InC resource" or "1st OoC resource") | Resource 2 ("2nd OoC resource") | Resource 3 ("GNSS resource") | Notes |
|---|---|---|---|---|
| UE is OoC, synchronized to OoC UE with SS_net without GNSS | SS from SS_oonPSBCH with InC_flag = 0 | | | R12/13 solution |
| UE is OoC, synchronized to OoC UE with SS_oon and without GNSS | SS from SS_oonPSBCH with InC_flag = 0 (The sync resource is selected depending on the resource of the incoming sync source) | | | R12/13 solution |
| UE is isolated and without GNSS | SS from SS_oonPSBCH with InC_flag = 0 (Random sync resource) | | | R12/13 solution |
| UE is OoC, synchronized to GNSS if incoverage UE's synchronization signal is successfully received. | | SS from SS_netPSBCH with InC_flag = 0 (PSBCH contents are aligned with in coverage UE's one) | Reserved SLSS ID, PSBCH (pre-configured contents) | |
| UE is OoC, synchronized to GNSS if incoverage UE's synchronization signal is not successfully received. | | | Reserved SLSS ID, PSBCH (pre-configured contents) | |

In the case where UE is OoC, synchronized to GNSS if incoverage UE's synchronization signal is successfully received in the above table, a part corresponding to Resource 3 ("GNSS resource") may or may not be transmitted. If the part is not transmitted, a transmitting UE does not transmit synchronization signals, thereby saving as much energy. If the part is transmitted, the transmitting UE always transmits at least one synchronization signal. Thus, a stable synchronization signal may be transmitted to a receiving UE.

Further, if a UE is synchronized to a synchronization signal in synchronization resource 3 (Resource 3), the following methods may be considered.

First, any of the remaining two resources may be randomly selected. In this method, UEs synchronized indirectly to a GNSS timing use distributed resources. Secondly, to protect synchronization resources of an in-coverage UE, a synchronization signal may be transmitted in a synchronization resource (Resource 2). This method may advantageously protect in-coverage synchronization resources, and enable reception of a synchronization signal from an in-coverage UE all the time. Thirdly, the network may configure or preconfigure resources to be used.

Meanwhile, UEs, which are synchronized to a synchronization signal transmitted in Resource 2, may select one of the following methods in order to select synchronization transmission resources: i) Resource 1 is used; ii) 1/3 of synchronization resources are randomly used; and iii) the network configures or preconfigures resources to be used.

Meanwhile, synchronization subframes are excluded from subframe indexing in current V2V. Therefore, even though TDD configurations are aligned between in-coverage and out-coverage, if the numbers of synchronization resources are different, communication between in-coverage and out-coverage is impossible. Therefore, to avert this problem, it is proposed that a UE excludes the positions of synchronization resources set for out-coverage UEs from V2V subframes. For example, even though an-coverage UE transmits a synchronization signal only in one synchronization resource, the UE does not perform V2V subframe indexing either in the synchronization resources set for the out-coverage UEs. Then, an in-coverage UE and an out-coverage UE perform subframe indexing on the assumption of the same synchronization resources, thereby overcoming the foregoing problem.

Meanwhile, the network may configure two or three sidelink resources. Irrespective of the number of sidelink resources, the agreement on synchronization source priority in the following Table 2 should be satisfied.

TABLE 8

If the UE detects no eNB in a carrier which is (pre-)configured as the carrier which potentially includes eNBs used as sync reference, when the (pre)configuration information indicates that eNB timing has higher priority than GNSS, the following priority rules should be applied: -P1': UE directly synchronized to eNB -P2': UE indirectly synchronized to eNB (i.e., UE whose SyncRef is another UE directly synchronized to eNB) -P3': GNSS -P4': UE directly synchronized to GNSS -P5': UE indirectly synchronized to GNSS (i.e., UE whose SyncRef is another UE directly synchronized to GNSS) -P4' and P5' are differentiated at least when two sync resources are (pre)configured. FFS whether P4' and P5' are differentiated when three sync resources are (pre)configured. -P6': The remaining UEs have the lowest priority. Note that when the (pre)configuration information indicates that GNSS has higher priority than eNB timing, the following agreements are kept. -P1: GNSS -P2: the following UE has the same priority: -UE directly synchronized to GNSS -UE directly synchronized to eNB -P3: the following UE has the same priority: -UE indirectly synchronized to GNSS (if RAN1 decides to differentiate between direct and indirect synchronization to GNSS) -UE indirectly synchronized to eNB -P4: the remaining UEs have the lowest priority.-When two resources are included, the following behavior is used. -The same sync resource is used for UEs directly synchronized with GNSS. -UE directly synchronized to GNSS is not required to monitor PSBCH in the other resource if GNSS is at the highest priority. -A UE that selecting SLSS ID = 0 with in-coverage indicator = 1 as its sync reference transmits SLSS = 0 with in-coverage indicator = 0. -In-coverage indicator is used to differentiate direct GNSS and in-direct GNSS -UE directly and indirectly synchronized to GNSS set in-coverage indicator to 1 and 0 respectively. -SLSS ID 168 is used to differentiate 1 hop sync. or more hops for GNSS based synchronization -FFS1 SLSS ID selection of "standalone UE". -Note: The sync resource for the in-coverage is one of the resource chosen from the out-of-coverage resources as D2D.-When three resources are included, the following behavior is used. -For UE InC following eNB timing: -Resource 1: PSBCH and SLSSID from NW, InC bit = 1. -For UE InC following GNSS timing: -Resource 1: PSBCH from NW, SLSSID = 0, InC bit = 1. -For UE OoC sync to UE InC: -Resource 2: PSBCH (except DFN) and SLSSID from Sync Ref, InC bit = 0. -For UE OoC sync to UE in partial coverage (i.e., with SLSSID from net and InC = 0): -Resource 1: PSBCH (except DFN) from Sync Ref, SLSSID from Sync Ref + 168, InC bit = 0. -For UE OoC sync to UE OoC, distinguish 2 cases: -If sync Ref UE is directly sync to GNSS (i.e., transmitting on resource 3). -Resource 2: PSBCH (except DFN) from Sync Ref, InC bit = 0. FFS2 SLSS ID.-Other cases:

TABLE 8-continued

-Use resource 1 or 2 (different from Sync Ref) with PBSCH (except DFN) and SLSSID from Sync Ref and InC bit = 0.
-For UE isolated without GNSS: -Resource 1 or 2, randomly: PSBCH from preconfiguration, InC bit = 0. FFS3 SLSSID selection -For UE OoC sync to GNSS. -Resource 3: PSBCH from preconfiguration, SLSSID = 0, InC bit = 0. -FFS4 behavior if UE reads PSBCH from another UE. -Note that Resource 1 is "InC resource" or "1st OoC resource", and Resource 2 and 3 are "2nd OoC resource" and "3rd OoC resource" respectively.

In order to distinguish indirectly synchronized to GNSS UE from standalone UE (P3 from P4 or P5' from P6'), with the above priority satisfied, a specific SLSS ID may be reserved or a PSBCH field may be set differently, for the indirectly synchronized to GNSS UE. A case in which two resources are configured will be described. According to the agreement, SLSS ID=0 and incoverage indicator=1 for a UE directly synchronized to the GNSS, and SLSS ID=0 and incoverage indicator=0 for a UE setting this UE as a synchronization reference. Therefore, if the standalone UE (a UE which autonomously determines a synchronization signal timing) randomly selects one of SLSS IDs 168 to 335 as is done conventionally, P3 or P5' may be distinguished from P4 or P6'. That is, if two resources are configured, the standalone UE may select one of SLSS IDs {168~335}.

A case in which three synchronization resources are configured will be considered below.

If a UE sets the GNSS as a synchronization reference, the UE transmits SLSS ID 0 in Resource 1 or 3. A synchronization signal relayed from the signal may be transmitted in Resource 2. To distinguish a synchronization signal relayed from in-coverage from a synchronization signal relayed from out-coverage, it is proposed that one from SLSS ID oon is reserved for a synchronization signal relayed from in-coverage, and another from SLSS ID oon is reserved for a synchronization signal relayed from out-coverage. For example, SLSS ID 168 is reserved for a synchronization signal propagated from in-coverage (and having an initial synchronization derived from the GNSS), and SLSS ID 169 is reserved for transmission of a synchronization signal to relay a timing (of a UE synchronized SLSS ID 0 and is delivered in synch Resource 3) propagated from out-coverage (FFS3 in the above). In this case, it is proposed that the standalone UE selects one of SLSS IDs 170 to 335. In this method, a direct/indirect GNSS UE may be distinguished from and a standalone UE, and an SLSS transmitted from within the network coverage may be distinguished from an SLSS transmitted from outside the network coverage. In a legacy Release 12/13 sidelink, a DMRS of a PSBCH is derived from an SLSS ID. In the case of same IDs and different PSBCH content, simultaneous reception of an SLSS and a PSBCH in the same resources (preconfigured or configured by the network), decoding is impossible because of the same DMRS but different codewords. To solve the problem, a UE synchronized to SLSS ID 0 transmitted in Resource 3 transmits SLSS ID 169 in Resource 2.

Meanwhile, in the case where the above proposal is accepted, if SLSS ID=1 for an in-coverage UE, a UE relaying a synchronization signal to the in-coverage UE in Resource 2 also uses the same SLSS ID (1+168), thus incurring a collision. Accordingly, it may be regulated that the network does not use SLSS ID 1.

Meanwhile, according to the above proposal, the SLSS ID sets of standalone UEs are different in the case of two synchronization resources and three synchronization resources. In the case of two synchronization resources, SLSS IDs 168 to 335 may be selected, and in the case of three synchronization resources, SLSS IDs 170 to 335 may be selected. Herein, in the case where different PLMNs are configured to perform sidelink transmission and reception in the same carrier, if different operators configure different numbers of synchronization resources, an SLSS ID set selected by standalone UEs become obscure. For example, if operation A configures two synchronization resources and selects an SLS ID from among SLSS IDs 168 to 335, operator B configures three synchronization resources and selects an SLSS ID from among SLSS IDs 170 to 335,and a standalone UE selects SLSS ID 168, what priority is to be assigned to this SLSS ID becomes obscure. To eliminate the obscurity, it is proposed that a standalone UE selects an SLSS ID from the same SLSS ID set irrespective of the number of resources. That is, even though two synchronization resources are configured in the above proposal, one of SLSS IDs 170 to 335 is selected to eliminate obscurity in inter-PLMN sidelink communication. That is, according to the proposal, even though two synchronization resources are configured, SLSS IDs 168 and 169 are reserved without being used.

The above description is also applicable to a UL or a DL, not limited to D2D communication. Then, an eNB, a relay node, or the like may use the proposed methods.

Examples of the above-described proposed methods may be included as one of methods for implementing the present disclosure. Thus, it is obvious that the examples may be regarded as proposed methods. Further, while the proposed methods may be implemented independently, some proposed methods may be combined (or integrated). It may be regulated that information indicating whether the proposed methods are applied or not (or information about rules of the proposed methods) is transmitted to a UE in a predefined signal (e.g., a physical-layer signal or a higher-layer signal) by an eNB.

Apparatuses according to Embodiment of the Disclosure

FIG. 11 illustrates configurations of a transmission point and a UE according to an embodiment of the present disclosure.

Referring to FIG. 11, a transmission point 10 according to the present disclosure may include a receiver 11, a transmitter 12, a processor 13, a memory 14, and a plurality of antennas 15. The plurality of antennas 15 mean that the transmission point 10 supports MIMO transmission and reception. The receiver 11 may receive various UL signals, data, and information from a UE. The transmitter 12 may transmit various DL signals, data, and information to a UE. The processor 13 may provide overall control to the transmission point 10. According to an embodiment of the present disclosure, the processor 12 of the transmission point 10 may process requirements of each of the foregoing embodiments.

Besides, the processor 13 of the transmission point 10 may compute and process information received by the transmission point 10 and information to be transmitted to the outside. The memory 14 may store computed and processed information for a predetermined time, and may be replaced with a component such as a buffer (not shown).

With continued reference to FIG. 11, a UE 20 according to the present disclosure may include a receiver 21, a transmitter 22, a processor 23, a memory 24, and a plurality of antennas 25. The plurality of antennas 25 mean that the UE 20 supports MIMO transmission and reception. The receiver 21 may receive various DL signals, data, and information from an eNB. The transmitter 22 may transmit various UL signals, data, and information to an eNB. The processor 23 may provide overall control to the UE 20.

According to an embodiment of the present disclosure, the processor 23 of the UE 20 may process requirements of each of the foregoing embodiments.

Besides, the processor 23 of the UE 20 may compute and process information received by the UE 20 and information to be transmitted to the outside. The memory 24 may store computed and processed information for a predetermined time, and may be replaced with a component such as a buffer (not shown).

The aforementioned transmission point and UE may be implemented such that the above-described various embodiments of the present disclosure are independently applied or two or more thereof are simultaneously applied, and description of redundant parts is omitted for clarity.

Further, the description of the transmission point 10 in the description of FIG. 11 is applicable to a relay as a DL transmission entity and a UL reception entity, and the description of the UE 20 in the description of FIG. 11 is applicable to a relay as a UL transmission entity and a DL reception entity.

The embodiments of the present disclosure may be achieved by various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

Apparatuses according to Embodiment of the Disclosure

FIG. 11 illustrates configurations of a transmission point and a UE according to an embodiment of the present disclosure.

Referring to FIG. 11, a transmission point 10 according to the present disclosure may include a receiver 11, a transmitter 12, a processor 13, a memory 14, and a plurality of antennas 15. The plurality of antennas 15 mean that the transmission point 10 supports MIMO transmission and reception. The receiver 11 may receive various UL signals, data, and information from a UE. The transmitter 12 may transmit various DL signals, data, and information to a UE. The processor 13 may provide overall control to the transmission point 10. According to an embodiment of the present disclosure, the processor 12 of the transmission point 10 may process requirements of each of the foregoing embodiments.

Besides, the processor 13 of the transmission point 10 may compute and process information received by the transmission point 10 and information to be transmitted to the outside. The memory 14 may store computed and processed information for a predetermined time, and may be replaced with a component such as a buffer (not shown).

With continued reference to FIG. 11, a UE 20 according to the present disclosure may include a receiver 21, a transmitter 22, a processor 23, a memory 24, and a plurality of antennas 25. The plurality of antennas 25 mean that the UE 20 supports MIMO transmission and reception. The receiver 21 may receive various DL signals, data, and information from an eNB. The transmitter 22 may transmit various UL signals, data, and information to an eNB. The processor 23 may provide overall control to the UE 20.

According to an embodiment of the present disclosure, the processor 23 of the UE 20 may process requirements of each of the foregoing embodiments.

Besides, the processor 23 of the UE 20 may compute and process information received by the UE 20 and information to be transmitted to the outside. The memory 24 may store computed and processed information for a predetermined time, and may be replaced with a component such as a buffer (not shown).

The aforementioned transmission point and UE may be implemented such that the above-described various embodiments of the present disclosure are independently applied or two or more thereof are simultaneously applied, and description of redundant parts is omitted for clarity.

Further, the description of the transmission point 10 in the description of FIG. 11 is applicable to a relay as a DL transmission entity and a UL reception entity, and the description of the UE 20 in the description of FIG. 11 is applicable to a relay as a UL transmission entity and a DL reception entity.

The embodiments of the present disclosure may be achieved by various means, for example, hardware, firmware, software, or a combination thereof.

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

The above embodiments of the present disclosure are applicable to various mobile communication systems.

What is claimed is:

1. A method performed by a second user equipment (UE) in a wireless communication system, the method comprising;
   receiving, by the second UE from a first UE directly synchronized to a Global Navigation Satellite System (GNSS), a first sidelink synchronization signal (SLSS) with a first SLSS ID,
   selecting, by the second UE, a second SLSS ID for a second SLSS based on the received first SLSS; and
   transmitting, by the second UE, the second SLSS,
   wherein, based on the first UE is out of a cell coverage and the first SLSS is received on a first resource, a first value related to GNSS-synchronization propagation through the out of the cell coverage is selected as the second SLSS ID, and
   wherein, based on the first UE is in the cell coverage and the first SLSS is received on a second resource, a second value related to GNSS-synchronization propagation through the out of the cell coverage is selected as the second SLSS ID.

2. The method of claim 1, wherein the first resource is different form the second resource.

3. A second User Equipment (UE) device comprising:
   at least one processor; and
   at least one computer memory operatively coupled to the at least one processor and storing instructions which, when executed, cause the at least one processor to perform operations,
   wherein the operations include:
   receiving, from a first UE directly synchronized to a Global Navigation Satellite System (GNSS), a first sidelink synchronization signal (SLSS) with first SLSS ID,
   selecting a second SLSS ID for a second SLSS based on the received first SLSS; and
   transmitting the second SLSS,
   wherein, based on the first UE is out of a cell coverage and the first SLSS is received on a first resource, a first value related to GNSS-synchronization propagation through the out of the cell coverage is selected as the second SLSS ID, and
   wherein, based on the first UE is in the cell coverage and the first SLSS is received on a second resource, a second value related to GNSS-synchronization propagation through the out of the cell coverage is selected as the second SLSS ID.

4. The UE of claim 3, wherein the second UE is capable of communicating with at least one of another UE, a UE related to an autonomous driving vehicle, the eNB, or a network.

5. A processing device configured to operate in a wireless communication system, the processing device comprising:
   at least one processor; and
   at least one memory operatively connected to the at least one processor and storing at least one instructions that, when executed by the at least one processor, causes the at least one processor to perform operations comprising:
   receiving, from a first UE directly synchronized to a Global Navigation Satellite System (GNSS), a first sidelink synchronization signal (SLSS) with a first SLSS ID,
   selecting a second SLSS ID for a second SLSS based on the received first SLSS; and
   transmitting the second SLSS,
   wherein, based on the first UE is out of a cell coverage and the first SLSS is received on a first resource, a first value related to GNSS-synchronization propagation through the out of the cell coverage is selected as the second SLSS ID, and
   wherein, based on the first UE is in the cell coverage and the first SLSS is received on a second resource, a second value related to GNSS-synchronization propagation through the out of the cell coverage is selected as the second SLSS ID.

6. A non-transitory computer-readable storage medium storing at least one computer program including instructions which, when executed by at least one processor, cause the at least one processor to perform operations for a second user equipment (UE),
   wherein the operations include:
   receiving, from a first UE directly synchronized to a Global Navigation Satellite System (GNSS), a first sidelink synchronization signal (SLSS) with a first SLSS ID,
   selecting a second SLSS ID for a second SLSS based on the received first SLSS; and
   transmitting the second SLSS,
   wherein, based on the first UE is out of a cell coverage and the first SLSS is received on a first resource, a first value related to GNSS-synchronization propagation through the out of the cell coverage is selected as the second SLSS ID, and wherein, based on the first UE is in the cell coverage and the first SLSS is received on a second resource, a second value related to GNSS-synchronization propagation through the out of the cell coverage is selected as the second SLSS ID.

* * * * *